United States Patent
Shimoi et al.

(10) Patent No.: US 8,715,872 B2
(45) Date of Patent: May 6, 2014

(54) FUEL CELL SYSTEM HAVING DECREASED DETERIORATION DURING INITIATION

(75) Inventors: Ryoichi Shimoi, Yokohama (JP); Takashi Iimori, Tokyo (JP); Kenichi Goto, Zama (JP); Tetsuya Kamihara, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1013 days.

(21) Appl. No.: 12/096,414

(22) PCT Filed: Dec. 26, 2006

(86) PCT No.: PCT/IB2006/003765
§ 371 (c)(1),
(2), (4) Date: Sep. 12, 2008

(87) PCT Pub. No.: WO2007/074378
PCT Pub. Date: Jul. 5, 2007

(65) Prior Publication Data
US 2009/0197129 A1    Aug. 6, 2009

(30) Foreign Application Priority Data

Dec. 27, 2005 (JP) .................................. 2005-374709
Dec. 27, 2005 (JP) .................................. 2005-374792

(51) Int. Cl.
*H01M 8/04* (2006.01)

(52) U.S. Cl.
USPC ........... 429/429; 429/428; 429/430; 429/431; 429/432

(58) Field of Classification Search
None
See application file for complete search history.

(56) References Cited

U.S. PATENT DOCUMENTS

| 5,170,124 A | 12/1992 | Blair et al. |
|---|---|---|
| 2003/0129462 A1 | 7/2003 | Yang et al. |
| 2004/0053089 A1 | 3/2004 | Balliet et al. |
| 2005/0031917 A1 | 2/2005 | Margiott et al. |
| 2005/0053810 A1* | 3/2005 | Kato et al. ..................... 429/13 |
| 2005/0074649 A1 | 4/2005 | Skiba et al. |
| 2005/0142407 A1 | 6/2005 | Fuller et al. |

FOREIGN PATENT DOCUMENTS

| EP | 1 207 578 | 5/2002 |
|---|---|---|
| EP | 1 969 662 A2 | 9/2008 |
| JP | 63-264876 | 11/1988 |
| JP | 2004-186137 | 7/2004 |
| JP | 2005-158555 | 6/2005 |

(Continued)

*Primary Examiner* — Ula C Ruddock
*Assistant Examiner* — Tony Chuo
(74) *Attorney, Agent, or Firm* — Drinker Biddle & Reath LLP

(57) ABSTRACT

A fuel cell system can be initiated in shorter time while minimizing the deterioration of a fuel cell. The fuel cell system includes a fuel cell stack having a fuel electrode, an oxidizer electrode and an electrolyte membrane disposed there between, the fuel cell producing electricity by an electrochemical reaction of a fuel gas and an oxidizer gas, which are supplied to the fuel electrode and the oxidizer electrode, respectively; a fuel gas supplying device for supplying the fuel gas to the fuel cell stack; an oxidizer gas supplying device for supplying the oxidizer gas to the fuel cell stack; a current controlling device for extracting a current from the fuel cell stack; and a voltage sensor disposed in at least two of the fuel cell stacks. A controller controls the current controlling device such that a minimum voltage, which is obtained from the voltage sensor after a fuel gas is supplied to the fuel electrode without supplying the oxidizer gas to the oxidizer electrode at the time of initiating, becomes zero volts or more. Then, the oxidizer gas is supplied to the oxidizer to start producing electricity.

33 Claims, 9 Drawing Sheets

(56) References Cited

FOREIGN PATENT DOCUMENTS

| JP | 2005-158557 | 6/2005 |
| JP | 2005-310435 | 11/2005 |
| JP | 2005-340004 | 12/2005 |
| WO | WO 2005/053075 | 6/2005 |
| WO | WO 2006/134461 | 12/2006 |

* cited by examiner

FUEL CELL SYSTEM HAVING DECREASED DETERIORATION DURING INITIATION

CROSS-REFERENCE TO RELATED APPLICATIONS

This application claims priority to Japanese Patent Application No. 2005-374709, filed on Dec. 27, 2005, and to Japanese Patent Application No. 2005-374792, filed Dec. 27, 2005, the disclosures of which are incorporated by reference herein in their entirety.

BACKGROUND OF THE INVENTION

1. Field of the Invention

The present invention relates to fuel cell systems.

2. Description of Related Art

In a conventional fuel cell system such as the one disclosed in Japanese Laid-Open Patent Publication No. 2005-158555, an air shut valve and an air pressure control valve are closed to block an air flow to a cathode when initiating or stopping the fuel cell system. Further, hydrogen is supplied from a hydrogen tank to an anode to generate electricity with a fuel cell and to extract power, thereby consuming oxygen remaining at the cathode.

However, in the conventional fuel cell system, cell voltage may become negative in a local cell of the fuel cell on account of a fuel shortage when output current is extracted. In such a state, a catalytic layer which becomes negative thereby may deteriorate

BRIEF SUMMARY OF THE INVENTION

An object of the invention is to provide a fuel cell system that can prevent deterioration caused by a mixture of fuel and oxidizer at a fuel cell electrode while simultaneously extracting as much current as possible. This may be achieved by controlling a current extracting means such that a minimum voltage, which is obtained from a voltage measuring means by supplying only the fuel gas at the time of initiating, becomes zero volts or more. Further, the fuel cell system of the present invention can prevent deterioration caused by negative cell voltage in a local cell of the fuel cell when a current is extracted. Consequently, the present invention can provide a fuel cell system that can be initiated in shorter time while minimizing the deterioration of a fuel cell at the time of initiating.

In accordance with an embodiment of the invention, a fuel cell system includes a fuel cell stack, a fuel gas supplying unit for supplying fuel gas to the fuel cell stack, and an oxidizer gas supplying unit for supplying oxidizer gas to the fuel cell stack. The fuel cell stack includes a plurality of stacked cells each formed by interposing an electrolyte membrane between a fuel electrode supplied with the fuel gas and an oxidizer electrode supplied with the oxidizer gas. The fuel cell system is characterized in that a current control device extracts a current from the fuel cell stack, a voltage sensor measures voltages from a plurality of different cells of the fuel cell stack, and a controller is electrically coupled to the current control device and the voltage sensor such that at a time of initiating operation of the fuel cell stack, the fuel gas is supplied to the fuel electrode without supplying the oxidizer gas to the oxidizer electrode, until such time as a minimum value detected by the voltage sensor becomes zero volts or more, whereupon the oxidizer gas is supplied to the oxidizer electrode to start producing electricity in the fuel cell stack.

Also, in accordance with an embodiment of the invention, a fuel cell system includes a fuel cell stack, a fuel gas supplying unit for supplying fuel gas to the fuel cell stack, and an oxidizer gas supplying unit for supplying oxidizer gas to the fuel cell stack. The fuel cell stack includes a plurality of stacked cells each formed by interposing an electrolyte membrane between a fuel electrode supplied with the fuel gas and an oxidizer electrode supplied with the oxidizer gas. The fuel cell system is characterized in that current extracting means extracts a current from the fuel cell stack, voltage measuring means measures voltages from a plurality of different cells of the fuel cell stack, and control means supplies only the fuel gas to initiate the fuel cell stack and extracts the current to make the voltages a predetermined value or below that does not deteriorate the fuel cell stack.

Further, in accordance with an embodiment of the invention, there is a method of operating a fuel cell system that includes a fuel cell stack, a fuel gas supplying unit for supplying fuel gas to the fuel cell stack, and an oxidizer gas supplying unit for supplying oxidizer gas to the fuel cell stack, wherein the fuel cell stack includes a plurality of stacked cells each formed by interposing an electrolyte membrane between a fuel electrode supplied with the fuel gas and an oxidizer electrode supplied with the oxidizer gas. The method is characterized by extracting a current from the fuel cell stack, measuring voltages from a plurality of different cells of the fuel cell stack, and initiating operation of the fuel cell stack by supplying the fuel gas to the fuel electrode without supplying the oxidizer gas to the oxidizer electrode.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

First Embodiment

Figure 1:
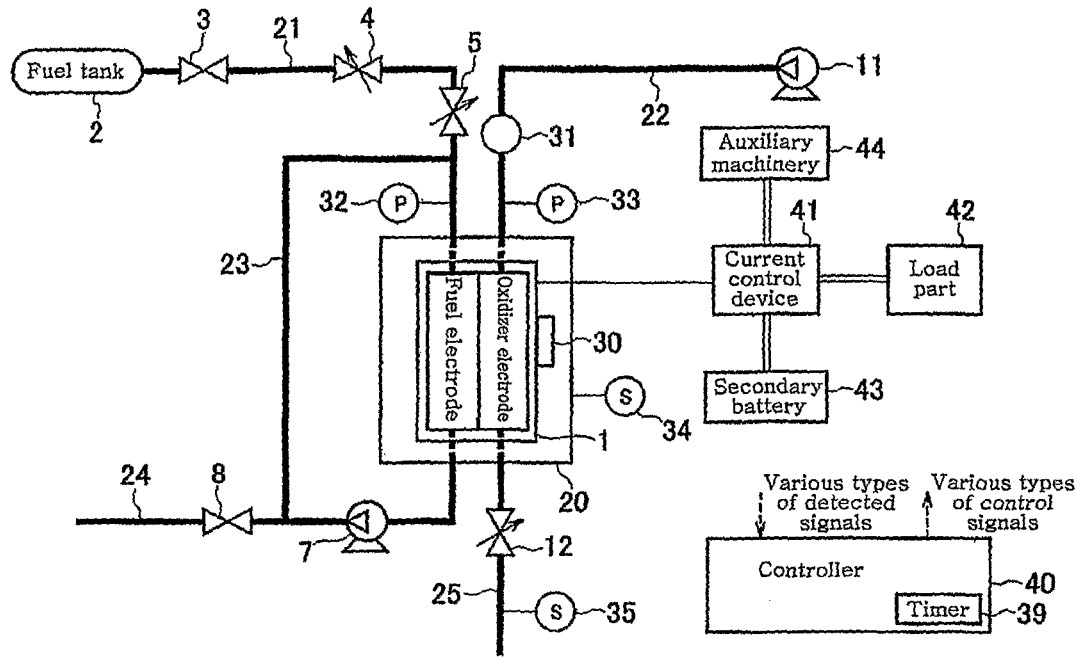
FIG. 1 illustrates a fuel cell system constructed in accordance with a first preferred embodiment of the present invention.

FIG. 1 illustrates a fuel cell system constructed in accordance with a first preferred embodiment of the present invention. The fuel cell system of the first preferred embodiment may be used, for example, as a source of power for a fuel cell vehicle. As shown in FIG. 1, the fuel cell system includes a fuel cell stack 1 for producing electricity by supplying hydrogen and air.

The fuel cell stack 1 includes a voltage sensor 30 as a means for detecting the voltage thereof. By including a voltage sensor in each cell or a group that includes several cells, the local voltage in each cell or group of cells and the total voltage in the fuel cell stack 1 may be detected. Further, the fuel cell stack 1 is installed in a fuel cell stack case 20. Also, a fuel sensor 34 (e.g., a fuel gas concentration sensor) is installed in the fuel cell stack case 20 or around an outlet of the fuel cell stack case 20.

A fuel gas supplying system preferably includes a fuel tank 2, a fuel supplying valve 3, a tank-side fuel pressure control valve 4, a fuel supplying pressure control valve 5, a fuel pressure sensor 32, a fuel purge valve 8, a fuel supplying pipe 21, and a fuel exhausting pipe 24. A fuel gas circulating system preferably includes a fuel circulating pump 7 and a fuel circulating pipe 23. An oxidizer gas supplying system preferably includes an oxidizer compressor 11, an oxidizer flow amount detector 31, an oxidizer pressure sensor 33, an oxidizer pressure control valve 12, a fuel sensor 35 (e.g., a fuel gas concentration sensor), an oxidizer supplying pipe 22, and an oxidizer exhausting pipe 25.

A loading system preferably includes a current control device 41, a secondary battery 43, auxiliary machinery 44, and a load part 42. Further, a control system preferably includes the fuel cell stack 1, and a controller 40 for controlling each component of the fuel gas supplying system, the fuel gas circulating system, the oxidizer gas supplying system and the load system based on signals detected by various detectors including sensors of the fuel gas supplying system, the oxidizer gas supplying system and the load system.

The fuel cell stack 1 preferably includes a plurality of cells for producing electricity. Each cell preferably includes an anode, e.g., a fuel electrode to which fuel gas in the form of hydrogen is supplied, a cathode, e.g., an oxidizer electrode to which oxidizer gas in the form of air is supplied, and an electrolyte disposed between the electrodes. In addition, the fuel cell stack 1 has a layered structure for the plurality of cells and converts chemical energy into electrical energy by electrochemical reactions of hydrogen and oxygen in the air. The hydrogen gas is supplied to the anode and the air is supplied to the cathode. As such, the following reactions can occur to produce electricity:

$$\text{Anode: } H_2 \rightarrow 2H^+ + 2e^- \quad (1)$$

$$\text{Cathode: } 2H^+ + 2e^- + \tfrac{1}{2}O_2 \rightarrow H_2O \quad (2)$$

That is, in each cell of the fuel cell stack 1, the hydrogen gas supplied to the anode is divided into hydrogen ions and electrons. Further, the hydrogen ions move through the electrolyte to the cathode and the electrons move through an external circuit to the cathode in order to produce electricity. In the cathode, oxygen (in the supplied air), the hydrogen ions (moved through the electrolyte) and the electrons (moved through the external circuit) are reacted together to produce water, which is then ejected to the outside.

In order to provide higher energy integration, lower price and lighter weight, a polymer electrolyte membrane may be employed as an electrolyte of the fuel cell stack 1. The polymer electrolyte membrane includes an ionic (i.e., proton) and conductive polymer membrane (e.g., a fluororesin ion exchange membrane), which is activated by hydration.

In order to produce electricity in the fuel cell stack 1, it is necessary to provide hydrogen (a fuel gas) and air (an oxidizer gas) to a fuel electrode and an oxidizer electrode, respectively, of each cell. To this end, the fuel gas supplying system, the fuel gas circulating system and the oxidizer gas supplying system are included in the fuel cell system.

In the fuel gas supplying system, the fuel gas is supplied to the anode through the fuel supplying valve 3, the tank-side fuel pressure control valve 4, the fuel supplying pressure control valve 5, and the fuel supplying pipe 21. High-pressure hydrogen supplied from the fuel tank 2 is decompressed to a predetermined pressure by the fuel supplying valve 3 and the tank-side fuel pressure control valve 4. Further, the hydrogen pressure in the fuel cell stack 1 is controlled to a desired hydrogen pressure by the fuel supplying pressure control valve 5.

In addition, a fuel gas circulating system including a fuel circulating pump 7 and a fuel circulating pipe 23 is installed to re-circulate hydrogen, which remains at the anode. Hydrogen pressure at the anode is controlled by the controller 40, which feedbacks the hydrogen pressure detected by the fuel pressure sensor 32 in order to drive the fuel supplying pressure control valve 5. By controlling the hydrogen pressure to a desired target pressure, hydrogen can be supplemented automatically up to an amount consumed by the fuel cell stack 1.

The fuel purge valve 8 preferably performs at least three functions. First, the fuel purge valve 8 ejects nitrogen accumulated in the fuel gas supplying system to facilitate a fuel circulating function. In the case of circulating the hydrogen, impurities such as nitrogen, carbon monoxide, or the like can accumulate inside the system, thus accompanying the circulation of the hydrogen. Further, if the impurities are excessively accumulated, then the hydrogen ejecting pressure decreases to reduce the output of the fuel cell stack 1. Also, the hydrogen circulating flow rate of the fuel gas circulating system decreases since the average mass of the circulating gas increases. Thus, the impurities along with the hydrogen are ejected from the fuel exhausting pipe 24 to the outside of the system by opening the fuel purge valve 8 to purge the inside of the hydrogen circulating system. Second, in order to recover the cell voltage of the fuel cell stack 1, water clogged in a gas flow passage or gas pipe may be blown out. Third, in order to substitute the fuel gas supplying system with hydrogen at the time of initiating, the gas inside the fuel gas supplying system will be ejected.

In the oxidizer gas supplying system, the compressor 11 supplies air to the cathode. Air pressure is controlled by the controller 40, which feeds back the air pressure detected by the oxidizer pressure sensor 33 in order to drive the oxidizer pressure control valve 12.

Next, the load system will be explained. The fuel cell stack 11 is electrically connected to the current control device 41. In addition, the current control device 41 is electrically connected to the secondary battery 43 capable of charging and discharging electricity as an auxiliary power supply, to the auxiliary machinery 44 required to produce electricity in the fuel cell system, and to the load part 42 such as a motor configured to drive a vehicle.

The current control device 41 extracts an output (i.e., current or power) from the fuel cell stack 1 or the secondary battery 43 (when discharging) to supply to the auxiliary machinery 44 and the load part 42. It also controls the charge and discharge of the secondary battery 43. The output extracting part of the current control device 41 may be configured to extract variable outputs or control the extracted output by connecting/disconnecting a fixed resistor.

Preferably, the controller 40 includes a microcomputer including a CPU, ROM, RAM, peripheral interfaces, etc. Further, the controller 40 receives detected signals from various types of detectors including sensors in the fuel cell stack 1, the fuel gas supplying system, the oxidizer gas supplying system and the load system. Based on the signals, the controller 40 controls each component of the fuel gas supplying system, the fuel gas circulating system, the oxidizer gas supplying system and the load system (for example, the controller drives various actuators) so as to control generation in the fuel cell system.

The controller 40 controls the current control device 41 such that the minimum voltage obtained from the voltage sensor 30 becomes zero volts or more after supplying the fuel gas to the fuel electrode without supplying the oxidizer gas to the oxidizer electrode of the fuel cell stack 1. Then, the oxidizer gas is supplied to the oxidizer electrode to initiate generation.

As for timing of extracting the current from the fuel cell stack 1 by the current control device 41, the controller 40 is preferably configured as follows. The controller 40 supplies the fuel gas to the fuel electrode. Then, the controller 40 preferably extracts the current from the fuel cell stack 1 by the current control device 41 after the minimum voltage obtained from the voltage sensor 30 becomes zero volts or more. Alternatively, for reliable timing control, it is preferred to extract the current from the fuel cell stack 1 by the current control device 41 after the minimum voltage obtained from the voltage sensor 30 becomes a predetermined value or more (e.g., approximately one or more dozens of millivolts per one cell).

In addition, the current extracted from the fuel cell stack 1 by the current control device 41 is preferably controlled to maintain or to be a target fuel utilization rate or below, which is calculated based on the supplied fuel gas.

The target command current, which the controller 40 instructs the current control device 41, is preferably a maximum amount or below of current or power to be consumed in the secondary battery 43 and the auxiliary machinery 44 of the fuel cell system.

In the first preferred embodiment of the present invention, extraction of the current from the fuel cell stack 1 by the current control device 41 is controlled based on the voltage of the fuel cell stack 1. The detailed constitution of the voltage sensor 30 will be explained with reference to FIGS. 2 to 5, which illustrate various configurations of the voltage sensor 30 installed in the fuel cell stack 1.

Figure 2:
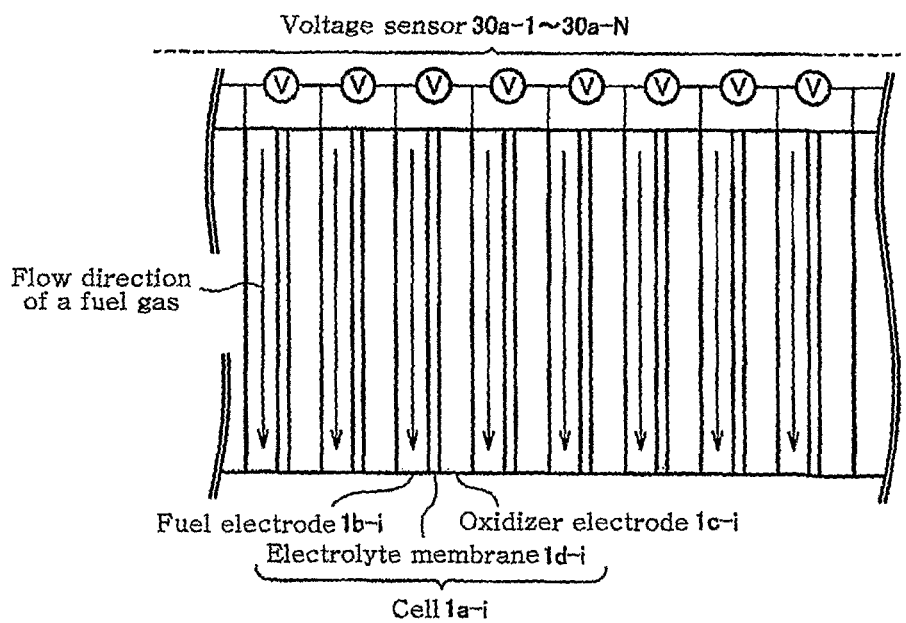
FIG. 2 illustrates a first configuration of a voltage sensor installed in a fuel cell stack.

In a first configuration of the voltage sensor 30, the fuel cell stack 1 has N cells and individual voltage sensors 30$a$-1 to 30$a$-N are installed in each cell respectively, as shown in FIG. 2. As to an individual cell 1$a$-$i$ in FIG. 2, reference numerals 1$b$-$i$, 1$c$-$i$ and 1$d$-$i$ denote the fuel electrode, the oxidizer electrode and the electrolyte membrane, respectively. As shown in FIG. 2, each voltage sensor 30$a$-$i$ is installed in a fuel gas supplying side of the fuel electrode 1$b$-$i$. However, the present invention is not limited to such an installation position. Rather, any installation position is available where the minimum electrical potential of each cell can be detected and the sensor is installable.

Figure 3:
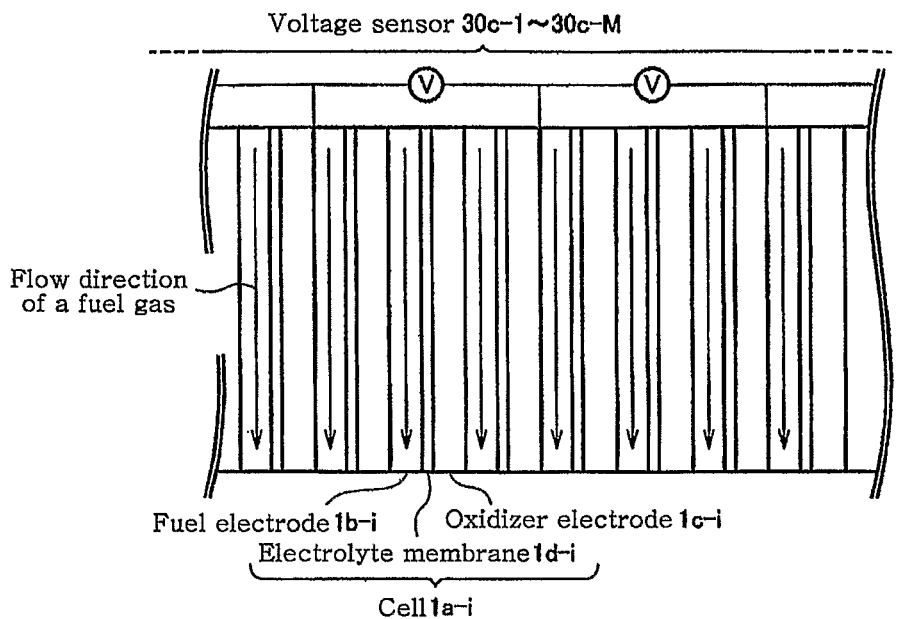
FIG. 3 illustrates a second configuration of a voltage sensor installed in a fuel cell stack.

As shown in FIG. 3, in a second configuration of the voltage sensor, the fuel cell stack 1 has N cells and the voltage sensors 30$c$-1 to 30$c$-M (e.g., M=N/3 in FIG. 3) are installed respectively in every few cells (e.g., one voltage sensor 30$c$ is shown for every three cells in FIG. 3).

Figure 4:
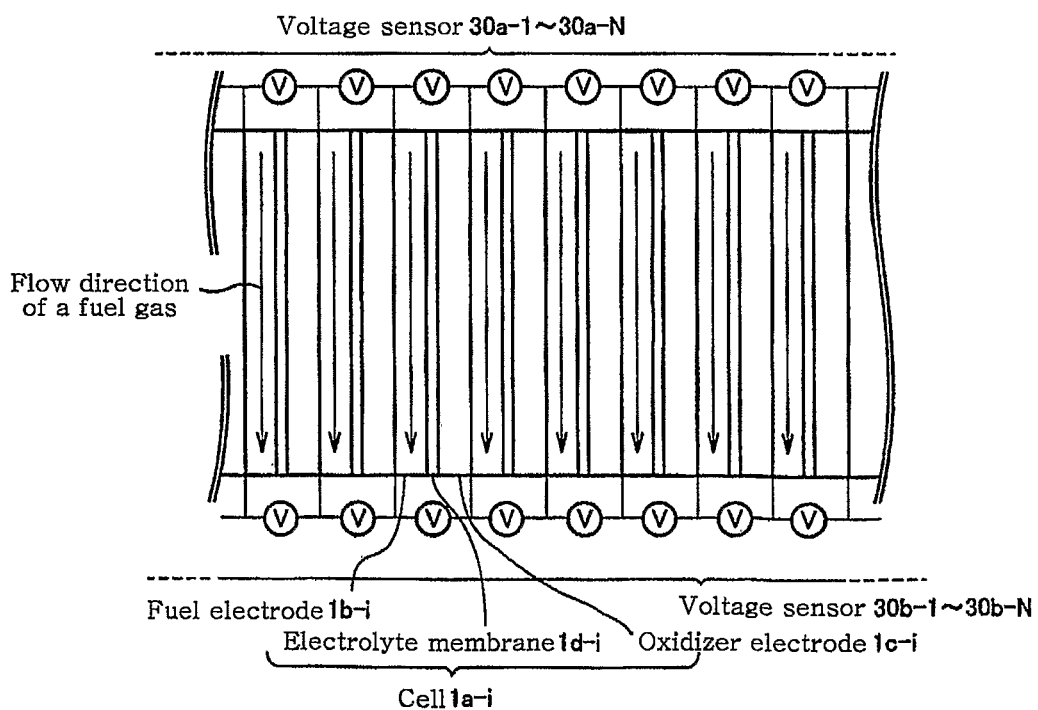
FIG. 4 illustrates a third configuration of a voltage sensor installed in a fuel cell stack.

As shown in FIG. 4, in a third configuration of the voltage sensor, the fuel cell stack 1 has N cells and a pair of voltage sensors are installed in every cell. Each pair of the voltage sensors 30$a$-1 to 30$a$-N and the voltage sensors 30$b$-1 to 30$b$-N is installed in every cell. Further, as shown in FIG. 4, the voltage sensor 30$a$-$i$ is installed in the fuel gas supplying side of the fuel electrode 1$b$-$i$, whereas the voltage sensor 30$b$-$i$ is installed in the fuel gas exhausting side of the fuel electrode 1$b$-$i$. However, the present invention is not limited to such installation. Rather, any installation position is available where the electrical potential of each cell can be detected in the constitution of the fuel cell stack 11 and the cell 1$a$-$i$ and the sensors are installable.

Figure 5:
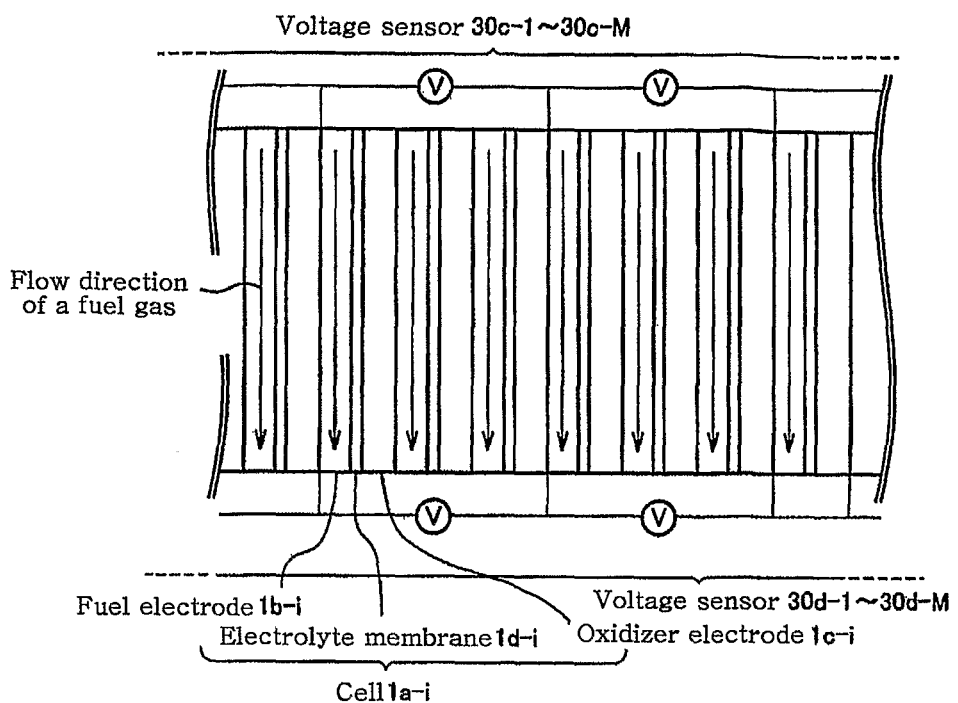
FIG. 5 illustrates a fourth configuration of a voltage sensor installed in a fuel cell stack.

As shown in FIG. 5, in the second configuration of the voltage sensor, the fuel cell stack 1 has N cells and a pair of the voltage sensors is installed in every few cells. Each pair of the voltage sensors 30$c$-1 to 30$c$-M and voltage sensors 30$d$-1 to 30$d$-M is installed in every few cells (e.g., one pair of voltage sensors 30$c$ and 30$d$ is shown for every three cells in FIG. 5).

Figure 6:
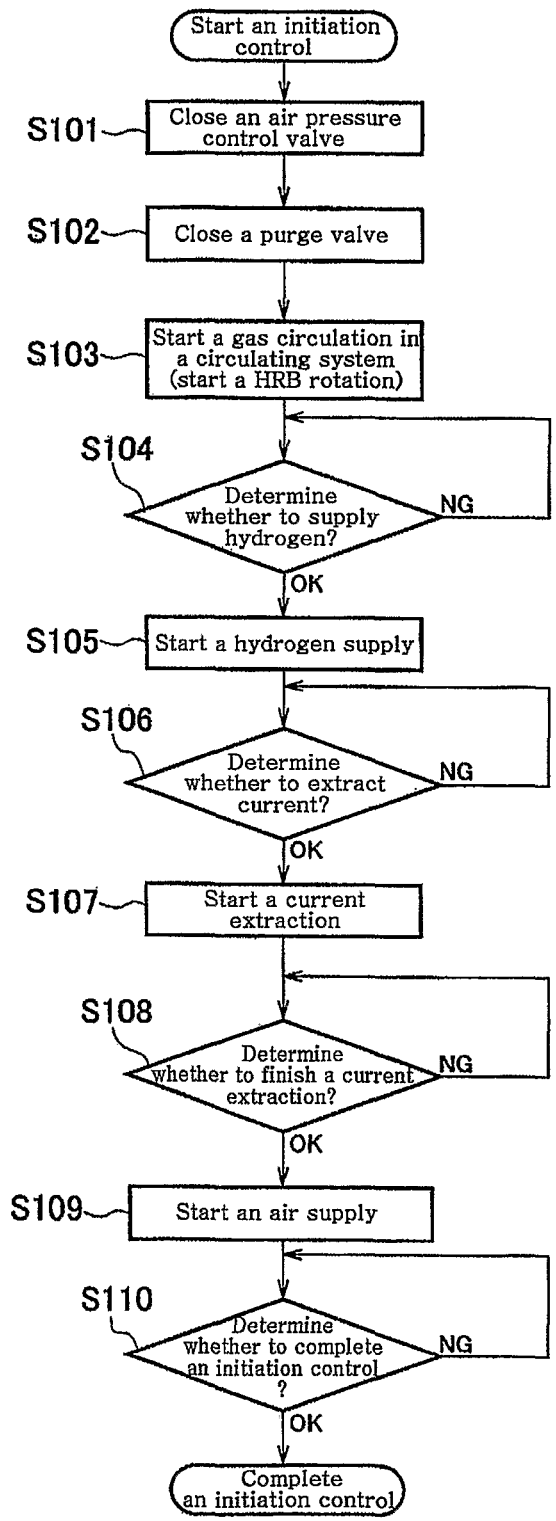
FIG. 6 is a flow chart showing the sequence of controlling the initiation of the fuel cell system.
Figure 7:
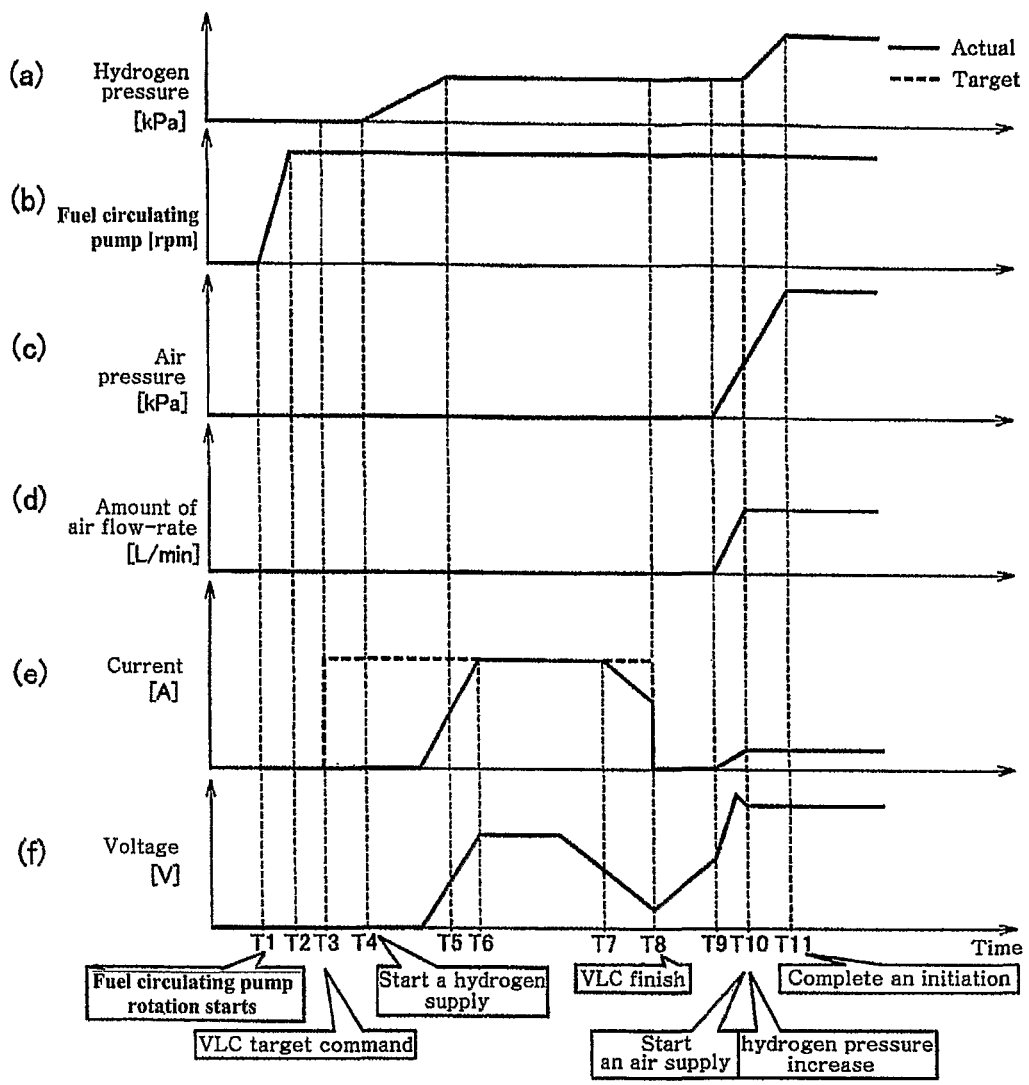
FIG. 7 is a timing chart of various parameters involved when initiating the fuel cell system.

Next, the operation of the controller 40, which initiates the fuel cell system of the present invention, will be explained with reference to FIGS. 6 and 7. FIG. 6 is a flow chart showing the sequence of controlling initiation of the fuel cell system. FIG. 7 is a timing chart of various parameters at the time of initiating the fuel cell system. In FIG. 7, graph (a) shows the hydrogen pressure of the fuel electrode in the fuel cell stack 1, graph (b) shows a motor RPM of the fuel circulating pump 7, graph (c) shows the air pressure at the oxidizer electrode of the fuel cell stack 1, graph (d) shows the air supplying flow rate, graph (e) shows the current extracted from the fuel cell stack 1 by the current control device 41, and graph (f) shows the local voltage of each cell or total voltage of the fuel cell stack 1.

As shown in FIG. 6, when the control starts, the controller 40 closes the oxidizer pressure control valve 12 to prevent the oxidizer gas from being supplied to the oxidizer electrode of the fuel cell stack 1 (S101). If the oxidizer compressor 11 is not initiated, then the air is not pressurized and this step is not necessarily required. Thereafter, the fuel purge valve 8 is closed since hydrogen purge is not required at the time of initiating (S102).

Next, the fuel circulating pump 7 of the fuel gas circulating system starts to be driven. Further, the gas in the fuel circulating pipe 23 starts to be re-circulated (S103) (time T1 in the timing chart of FIG. 7).

Then, it is determined whether to start the supply of hydrogen to the anode of the fuel cell stack 1 by the fuel gas supplying system (S104). If so, then the supply of hydrogen begins (S105) (time T4).

Determining whether to start the supply of hydrogen depends on whether a timer 39 measures a predetermined time after the fuel gas circulation by the fuel gas circulating system starts, or whether a fuel flow rate measuring instrument that may be installed in the circulating fuel pipe 23 measures a predetermined fuel gas circulating flow rate. Further, the timer 39 may be a software timer, which may be embodied in a CPU in the controller 40, or an auxiliary hardware timer.

Next, it is determined whether to start a current extraction from the fuel cell stack 1 by the current control device 41 (S106). If so, then the current extraction begins (S107).

In the method of a voltage limit control ("VLC") for initiation, determining whether to start the current extraction depends on whether the timer 39 measures a predetermined time after starting the fuel gas circulation by the fuel gas circulating system. Alternatively, such determination can be performed concurrently with starting the supply of hydrogen by the fuel gas supplying system (no waiting time). In the method of the voltage limit control (VLC) for initiation, only the hydrogen is supplied by the fuel gas supplying system at the time of initiating and the current (i.e., output) is extracted to make the voltage of the fuel cell stack 1*a* predetermined value or below (i.e., the upper limit of voltage that does not deteriorate the fuel cell stack 1). Then, generation starts as the oxidizer gas supplying system starts to supply the air.

However, the present invention is characterized in that the start-timing of extracting the current from the fuel cell stack 1 by the current control device 41 depends on the voltage of the fuel cell stack 1. Determining whether to start the current extraction is performed based on the detected results of the voltage sensor 30. In other words, the fuel gas is supplied to the fuel electrode and the minimum voltage obtained from the voltage sensor 30 (i.e., sensors 30*a-i*, 30*a-i* and 30*b-i* (i=1 to N), 30*c-j*, or 30*c-j* and 30*d-j* (j=1 to M)) becomes zero volts or more or a predetermined value (e.g., approximately one or more dozens of millivolts per one cell). Further, the current is extracted from the fuel cell stack 1 by the current control device 41.

As shown in graph (e) of FIG. 7, although the timing chart of FIG. 7 shows that an amount of target command current (VLC target instruction), which is instructed to the current control device 41 by the controller, is set at the time T3 when the timer 39 measures a predetermined time after starting the fuel gas circulation by the fuel gas circulating system, the actual current extraction by the current control device 41 starts after the minimum cell voltage of the fuel cell stack 1 becomes zero volts or more [see graph (f) of FIG. 7]. Further, it is preferred that the actual current extraction by the current control device 41 starts after the minimum cell voltage of the fuel cell stack 1 becomes more than a predetermined value or more.

Next, it is determined whether to finish the current extraction from the fuel cell stack 1 by the current control device 41 (S108). If so, then air starts to be supplied to the cathode of the fuel cell stack 1 by the oxidizer gas supplying system (S109).

Determining whether to finish the current extraction depends on whether the timer 39 measures a predetermined time after the current control device 41 starts the current extraction. Alternatively, it depends on the variations of the voltages of the fuel cell stack 1 (total voltage of the fuel cell stack 1) or the variations of the current amount extracted by the current control device 41.

Next, it is determined whether the VLC for initiation is completed (S110). If so, then the control for initiation is completed and a normal driving control starts.

Determining whether the VLC is completed depends on whether the timer 39 measures a predetermined time after the current extraction of the current control device starts or finishes. Alternatively, it depends on the variations of the voltages of the fuel cell stack 1 (i.e., total voltage of the fuel cell stack 1).

As shown in graphs (e) and (f) of FIG. 7, finishing the current extraction (i.e., VLC finish) of the current control device 41 is performed at the time T8. Further, as shown in graphs (c) and (d) of FIG. 7, air supply by means of the oxidizer gas supplying system starts at the time T9 after a predetermined time. Thereafter, the hydrogen pressure increases at the time T10 [see graph (a) of FIG. 7] and determining to complete the initiation control is performed at the time T11.

Figure 8:
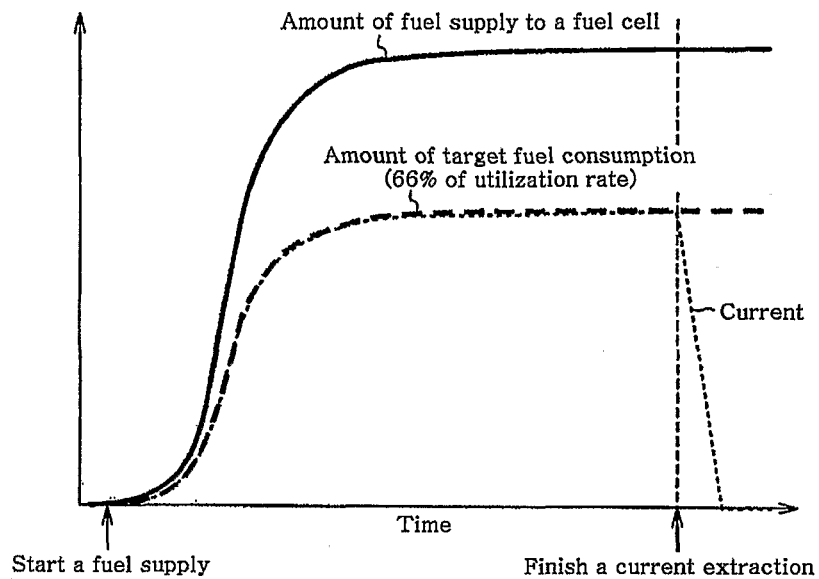
FIG. 8 is a first timing chart showing a current control of a current control device constructed in accordance with the first preferred embodiment of the present invention.
Figure 9:
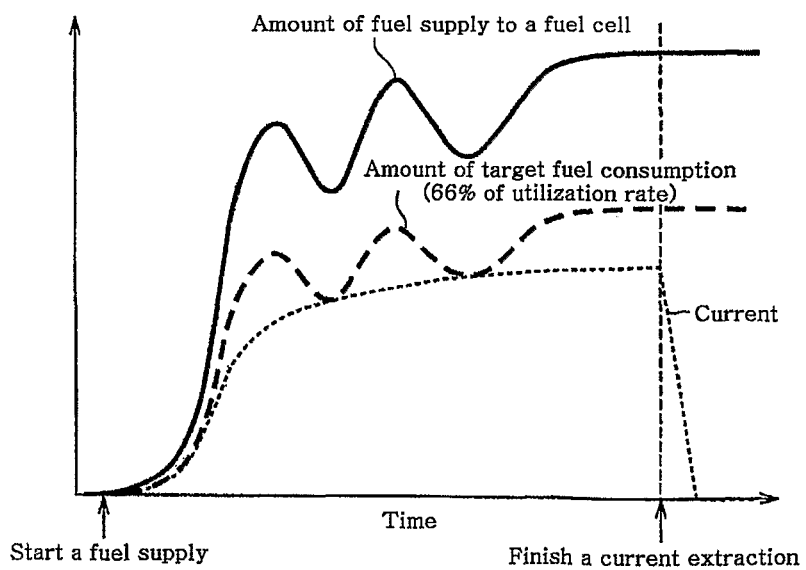
FIG. 9 is a second timing chart showing a current control of a current control device constructed in accordance with the first preferred embodiment of the present invention.

Next, with reference to FIGS. 8 and 9, the current control of the current control device 41 after starting the current extraction from the fuel cell stack 1 (S107) will be explained in detail. FIGS. 8 and 9 illustrate the timing charts showing the current control of the current control device 41 according to the present invention.

In initiating the current extraction of the current control device 41, the controller 40 sets the amount of a target command current in which the controller 40 instructs the current control device 41. Further, the amount of the target command current may be set as a value to maintain or to be a target utilization rate or below of the fuel, which is calculated from the supplied hydrogen.

The target utilization rate of the fuel recirculated by the fuel gas circulating system indicates the amount of hydrogen that is consumed in the fuel cell stack 1 relative to the amount of hydrogen that is supplied to the anode of the fuel cell stack 1. The target utilization rate of the fuel is 100% or below. That is, the amount of current extracted from the fuel cell stack 1 corresponds to the amount of hydrogen consumed in the fuel cell stack 1. Therefore, a shortage of hydrogen in the fuel cell stack 1 can be prevented by setting the amount of target command current as a value to maintain or to be the target utilization rate or below of the fuel.

Further, the amount of target command current is a value the maximum amount or below of current or power consumed in the secondary battery 43 and the auxiliary machinery 44 of the fuel cell system.

In FIG. 8, a solid line shows the amount of fuel supplied to the anode of the fuel cell stack 1 by the fuel gas supplying system. Further, a dashed line shows the target amount of fuel consumption at 66% of the target utilization rate of the fuel. At this time, the controller 40 sets the amount of target command current as the value to maintain the target utilization rate of the fuel. Therefore, the current extracted from the fuel cell stack 1 by the current control device 41 follows the dotted line.

In FIG. 9, there are great variations in the amount of fuel (solid line in FIG. 9) supplied to the anode of the fuel cell stack 1 by the fuel gas supplying system. In such a case, it is difficult to reliably control the amount of current extracted by the fuel control device 41. Therefore, the controller 40 sets the amount of target command current to remain the target utilization rate or below of the fuel. That is, the target amount of fuel consumption at 66% of the target utilization rate of the fuel follows the dashed line. Thus, the amount of current extracted from the fuel cell stack 1 by the current control device 41 (i.e., the dotted line in FIG. 9) is limited by setting the amount of target command current to become a minimum value or below of the target utilization rate of the fuel.

As such, the fuel cell system of the present invention supplies only a fuel gas at the time of initiation and extracts the current by the current control device 41. This is so that the minimum cell voltage of the fuel cell stack 1 becomes zero volts or more. Therefore, deterioration caused by the mixture of the fuel and the oxidizer in the fuel electrode can be prevented, and thus it is possible to extract the current as much as possible. Further, deterioration resulting from negative cell voltage on a local cell of the fuel cell stack 1 when extracting current can be prevented. Consequently, the deterioration of the fuel cell stack at the time of initiating can be prevented as much as possible. Thus, a fuel cell system, which is capable of performing initiation in shorter time and with high durability, can be achieved.

As for the timing of extracting the current from the fuel cell stack 1 by the current control device 41, the controller 40 of the present invention supplies fuel gas to the fuel electrode. Thereafter, when the minimum voltage obtained from the voltage sensor 30 becomes zero volts or more, the controller 40 extracts the current from the fuel cell stack 1 by means of the current control device 41. Therefore, the deterioration of the local cell of the fuel cell stack 1 resulting from extracting the current without sufficient fuel can be prevented. As a result, deterioration at the time of initiation can be more reliably prevented.

Further, in order to perform a reliable timing control, the controller 40 of the present invention extracts the current from the fuel cell stack 1 by means of the current control device 41 after the minimum voltage obtained from the voltage sensor 30 becomes more than a predetermined value or more (e.g., approximately one or more dozens of millivolts per one cell). Severe deterioration has not yet started and the current can be extracted after the fuel supply is confirmed. Therefore, the deterioration of the local fuel cell of the fuel cell stack 1 resulting from extracting the current without sufficient fuel can be prevented. As a result, deterioration at the time of initiation can be more reliably prevented.

The controller 40 of the present invention controls the current extracted from the fuel cell stack 1 by means of the current control device 41 to be set as a value, which is capable of maintaining the target utilization rate of the fuel calculated from the supplied fuel gas. By controlling the extracted amount of current in accordance with the supplied amount of fuel gas, insufficient fuel can be prevented even in case of excessive fuel supply. Further, the current is extracted as much as possible without deterioration. As a result, the fuel cell system can perform the initiation in shorter time and with high durability.

The controller 40 of the present invention controls the current extracted from the fuel cell stack 1 by means of the current control device 41 to be the target utilization rate or below of the fuel calculated from the supplied fuel gas. By controlling the extracted amount of current in accordance with the supplied amount of fuel gas, the fuel insufficiency can be prevented even in case of excessive fuel supply. Further, setting the utilization rate of the fuel to a lower value can augment the advantage of preventing shortage of the fuel. In addition, the current is extracted as much as possible without deterioration. As a result, the fuel cell system can perform the initiation in shorter time and with high durability.

The controller 40 of the present invention sets the amount of target command current, which is instructed to the current control device 41, to be the maximum amount or below of current consumed in the secondary battery 43 and the auxiliary machinery 44 of the fuel cell system. Since the amount of target command current is changed in accordance with the state of the fuel cell system, the current is extracted as much as possible without deterioration and without any errors. Thus, the fuel cell system can perform reliable initiation in shorter time.

In the present embodiment, the controller 40 sets the amount of target command current, which is instructed to the current control device 41, to be the maximum amount or below of power consumed in the secondary battery 43 and the auxiliary machinery 44 of the fuel cell system. Since the amount of target command current is changed in accordance with the state of the fuel cell system, the current is extracted as much as possible without deterioration and without any errors. Further, the voltage variations can be properly dealt with. As such, the fuel cell system can perform reliable initiation in shorter time without any errors.

In the present embodiment, a fuel gas circulating system for circulating the fuel gas, which is not consumed in the fuel cell stack 1, to the fuel gas supplying system is provided. By completely closing the fuel electrode when initiating, discharge of the fuel gas from the fuel cell system can be prevented at the time of initiating. Accordingly, the fuel gas is not discharged during initiating. Further, the fuel circulating pump 7 is used as a means for circulating the fuel gas in the present embodiment. However, an ejector can be also used.

In the present embodiment, the voltage sensor 30 is installed in each cell of the fuel cell stack 1. As a result, the deterioration or the possibility of deterioration can be more reliably determined.

In the present embodiment, the voltage sensor 30 is installed in every few cells of the fuel cell stack 1. As a result, the deterioration or the possibility of deterioration can be more reliably determined with a simple feature. Thus, the fuel cell system can be provided with a lower cost.

In the present embodiment, a pair of the voltage sensors 30 is provided to measure the voltages in two spots of a single cell or a plurality of cells. As a result, it is possible to keep driving without an exchange even if one of them is broken. Thus, the reliability of the fuel cell system can be improved.

In the present embodiment, the voltages of the two spots of the fuel gas supplying side and the fuel gas ejecting side of the fuel electrode are measured with regard to the single cell or a plurality of cells. As a result, the state where the fuel gas is being supplied in the cell can be reliably determined. Further, the deterioration at the time of initiating can be prevented.

Second Embodiment

The fuel cell system constructed in accordance with a second preferred embodiment of the present invention will be discussed below. The features of the fuel cell system of the second preferred embodiment are essentially identical to the features of the first preferred embodiment (FIGS. 1 to 5). Thus, specific explanations of each feature, other than those provided below, are omitted herein.

A controller 40 of the second preferred embodiment differs from that of the first embodiment, as discussed below. First, a current extracted from a fuel cell stack 1 by a current control device 41 is controlled so that all voltages obtained by a voltage sensor 30 at the time of initiating becomes zero volts or more. The current is a maximum value when all voltages obtained by the voltage sensor 30 at the time of initiating becomes zero volts or more. Secondly, the current extracted from the fuel cell stack 1 by the current control device 41 is a maximum value determined by a sum of a charging amount to the secondary battery 43 and a consumed power of the auxiliary machinery 44 of the fuel cell system.

The overall control of the controller at the time of initiating is similar to that of the first embodiment (FIGS. 6 and 7). Thus, specific explanations thereon will be omitted herein.

The second preferred embodiment is characterized by a current control after starting the current extraction from the fuel cell stack 1 by the current control device 41 (S107 in FIG. 6). Thus, the characteristic features will be specifically explained with reference to FIGS. 10 and 11, which illustrate the timing charts showing the current control of the current control device 41 of the second preferred embodiment.

Figure 10:
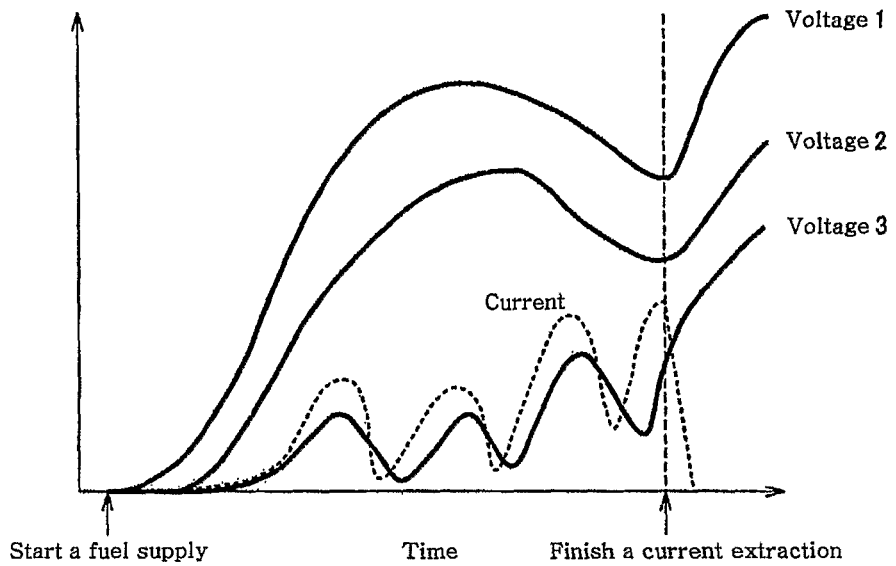
FIG. 10 is a first timing chart showing a current control of a current control device constructed in accordance with a second preferred embodiment of the present invention.
Figure 11:
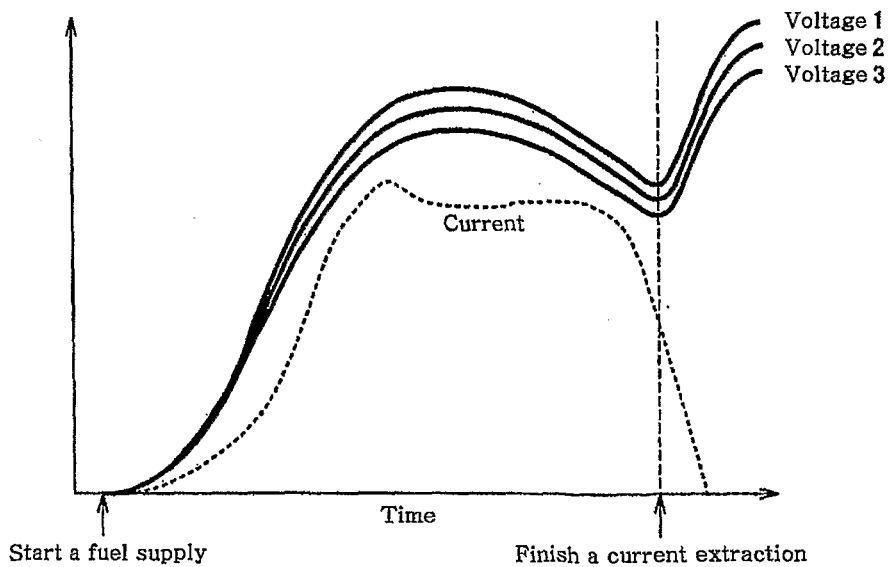
FIG. 11 is a second timing chart showing a current control of a current control device constructed in accordance with the second preferred embodiment of the present invention.

In the second preferred embodiment, the voltages obtained from the voltage sensor 30 are monitored even after starting the current extraction. Further, the minimum voltage is renewed in turns by monitoring to change the amount of target command current depending on the minimum cell voltage. That is, as shown in FIGS. 10 and 11, for example, when the cell voltage follows the temporal developments such as Voltage 1, Voltage 2 and Voltage 3, the amount of target command current is changed depending on the minimum (Voltage 3). Specifically, if the voltage becomes around zero volts, then the target command current has a lower value. Further, if the voltage becomes much larger than zero volts, then the target command current has a higher value.

As explained above, in the fuel cell system of the second preferred embodiment, the controller 40 controls the current extracted from the fuel cell stack 1 by the current control device 41. This is so that all voltages obtained from the voltage sensor 30 at the time of initiating becomes zero volts or more. To this end, in the local cell of the fuel cell stack 1 to be measured, deterioration caused by the current pulling in the state of insufficient fuel can be prevented. Consequently, deterioration at the time of initiating can be reliably prevented even if the variations of the fuel among the cells are large.

In the second embodiment, as for the controller 40, the current extracted from the fuel cell stack 1 by the current control device 41 is provided as a maximum current when all voltages obtained from the voltage sensor 30 at the time of initiating becomes zero volts or more. By extracting the current as much as the current control device 41 can extract, the deterioration caused by the mixture of the fuel and the oxidizer in the fuel electrode can be drastically limited. Further, the current can be extracted as much as possible without any deterioration. As a result, the initiation can be accomplished in shorter time with drastic limit in deterioration.

In the second embodiment, as for the controller 40, the current extracted from the fuel cell stack 1 by the current control device 41 is provided as a maximum value determined from a sum of a charging amount to the secondary battery 43 and a power consumed in the auxiliary machinery 44 of the fuel cell system. By determining the amount of the current depending on the amount obtained from the constitutional restrictions on the fuel cell system, the amount of the current can be set in accordance with the state of the fuel sell system. Further, the current can be extracted as much as possible without any deterioration. As a result, an initiating control adapted to the state of the fuel cell system can be performed and initiation can be accomplished in shorter time.

Third Embodiment

The fuel cell system constructed in accordance with a third preferred embodiment of the present invention will be discussed below. The features of the fuel cell system of the third embodiment are essentially identical to those of the first preferred embodiment (FIGS. 1 to 5). Thus, specific explanations of each feature, other than those provided below, will be omitted herein.

A controller 40 of the third preferred embodiment differs from that of the first embodiment, as discussed below. First, a current extracted from a fuel cell stack 1 by a current control device 41 is controlled depending on the total voltage of the fuel cell stack 1 obtained by the voltage sensor 30. The current is controlled to increase as the total voltage of the fuel cell stack 1 increases, and the current is controlled such that the variations of all voltages obtained from the voltage sensor (voltage measuring means) 30 become a predetermined value or below.

The overall control of the controller at the time of initiating is similar to the first embodiment (FIGS. 6 and 7). Thus, specific explanations thereon will be omitted herein.

The third embodiment is characterized by the current control after starting the current extraction from the fuel cell stack 1 by the current control device 41 (S107 in FIG. 6). The current control will be specifically discussed with reference to FIG. 12.

Figure 12:
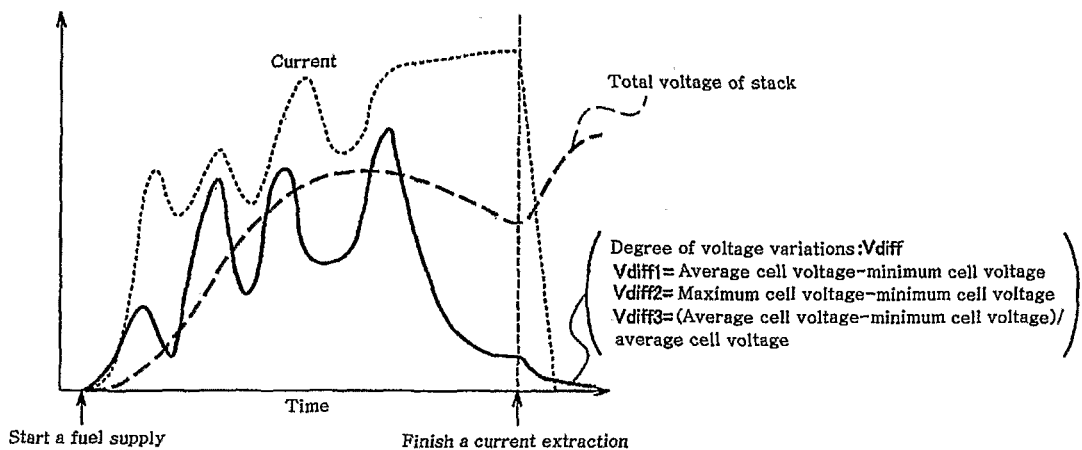
FIG. 12 is a timing chart showing a current control of a current control device constructed in accordance with a third preferred embodiment of the present invention.

FIG. 12 illustrates a timing chart showing the current control of the current control device 41 of the third preferred embodiment. In FIG. 12, a dashed line indicates a total voltage of the stack, a solid line indicates a degree of the voltage variations Vdiff, and a dotted line indicates the current extracted by the current control device 41.

In the third embodiment, a degree of all voltage variations Vdiff obtained by the voltage sensor 30 (e.g., any voltage measuring means) is calculated and the amount of target command current is changed depending on the degree of the voltage variations. That is, the higher the degree of the voltage variations Vdiff becomes, the lower the amount of target command current is set, and vice-versa.

A method of calculating the degree of the voltage variations Vdiff is as follows:

$$Vdiff1 = \text{average cell voltage} - \text{minimum cell voltage} \quad (3)$$

$$Vdiff2 = \text{maximum cell voltage} - \text{minimum cell voltage} \quad (4)$$

$$Vdiff3 = (\text{average cell voltage} - \text{minimum cell voltage})/\text{average cell voltage} \quad (5)$$

As explained above, in the fuel cell system of the third embodiment, the controller 40 controls the current extracted from the fuel cell stack 1 by the current control device 41 depending on the total voltage of the fuel cell stack 1 obtained by the voltage sensor 30 to increase as the total voltage of the fuel cell stack 1 increases. By setting the amount of the current depending on the total voltage of the fuel cell stack, the initiation control can be provided without adding components to the conventional fuel cell system. Thus, the deterioration at the time of initiating can be effectively prevented with lower cost. Further, the current can be extracted as much as possible without any deterioration and initiation can be accomplished in shorter time.

In the third embodiment, the controller 40 controls via the current control device 41 an increase in the current that is extracted from the fuel cell stack 1 as there is an increase in the total voltage of the fuel cell stack 1, as obtained by the voltage sensor 30. The amount of the current is controlled depending on the total voltage of the fuel cell stack 1. The current is controlled to be higher when the voltage is higher and vice-versa. Further, it is possible to effectively limit any deterioration caused by the mixture of the fuel and the oxidizer in a fuel electrode as well as by insufficient fuel. Therefore, it is possible to limit any deterioration caused at the time of initiating. Further, the current can be extracted as much as possible without deterioration and initiation can be accomplished in shorter time.

In the third embodiment, the control means 40 controls the current extracted from the fuel cell stack 1 by the current control device 41 such that the variations of all voltages obtained from the voltage sensor 30 become a predetermined value or below. Since voltage variations are calculated with all voltages and the amount of the current is increased when the variation is small, and vice-versa, the deterioration caused by the current pulling in the state of insufficient fuel can be effectively prevented. Further, the current can be extracted as much as possible without any deterioration and initiation can be accomplished in shorter time.

Fourth Embodiment

A controller 40 begins the current extraction, via a current control device 41, after fuel gas is supplied to the fuel electrode without supplying oxidizer gas to the oxidizer electrode, and terminates the current extraction based on the voltage of a fuel cell stack 1. Thereafter, the controller 40 supplies oxidizer gas to the oxidizer electrode of the fuel cell stack 1 to begin generating electricity. In one embodiment, based on the total voltage of the fuel cell stack 1 obtained by a voltage sensor 30, it is determined whether a current control device 41 terminates the current extraction.

Further, the controller 40 terminates the current extraction through the current control device 41, if it is determined that the ratio of the fuel gas concentration to the oxidizer gas concentration is greater than a predetermined value in the fuel electrode based on the voltage (e.g., total voltage) of the fuel cell stack 1.

In addition, the controller 40 determines that the ratio of the fuel gas concentration to the oxidizer gas concentration is a predetermined value or more in the fuel electrode based on the voltage (e.g., total voltage) of the fuel cell stack 1. Further, at the same time, when the oxidizer gas concentration of the oxidizer electrode begins to decrease, the controller 40 terminates the current extraction through the current control device 41.

Moreover, the controller 40 terminates the current extraction through the current control device 41, if the voltage (e.g., total voltage) of the fuel cell stack 1 decreases. Specifically, the controller 40 records a maximum value of the voltage (e.g., total voltage) of the fuel cell stack 1 and terminates the current extraction through the current control device 41, if the voltage of the fuel cell stack 1 is reduced from the maximum value to a predetermined value or ratio.

As such, in the present embodiment, based on the voltage parameter of the fuel cell stack 1, it is determined whether the current extraction through the current control device 41 is terminated.

Next, referring now to FIG. 6, the portions that are different from the first preferred embodiment will be explained.

In one embodiment, whether a current extraction begins or not is determined based on whether the timer 39 counts a predetermined time after the fuel gas circulation is started by the fuel gas circulation system or after the supply of hydrogen is started by the fuel gas supply system. Alternatively, the above is determined at the same time (without waiting) as the hydrogen begins to be supplied by the fuel gas supply system.

As shown in graph (c) of FIG. 7, although a target command current amount (VLC target command) instructed to the current control device 41 by the controller 40 is set at the time T3, i.e., the time measured by the timer 39 after starting the fuel gas circulation by the fuel gas circulation system, the current extraction through the current control device 41 actually starts at the time measured by the timer 39 after starting the supply of hydrogen by the fuel gas supply system (after the minimum value of cell voltage of the fuel cell stack 1 becomes greater than zero volts or a predetermined value. See graph (f) of FIG. 7).

Next, it is determined whether the current extraction from the fuel cell stack 1 by the current control device 41 is terminated or not (S108). If so, the oxidizer gas supply system begins to supply air to a cathode of the fuel cell stack 1 (S109).

In one embodiment, whether the current extraction is terminated or not is determined at initiation VLC in a broad sense.

Next, it is determined whether the initiation control by VLC is completed or not (S110). If so, the initiation control is then completed and a conventional driving control is performed.

In one embodiment, whether the initiation control is completed or not is determined based on whether the timer 39 measures a predetermined time after terminating the current extraction or beginning the current extraction by the current control device 41. Alternatively, such operation is performed based on the change of voltage parameter of the fuel cell stack 1 (e.g., total voltage of the fuel cell stack 1).

In the timing charts (e) and (f) in FIG. 7, whether the current extraction is terminated (VLC finish) by the current control device 41 is determined at the time T8. Further, as shown in the timing charts (c) and (d) of FIG. 7, air supply is started by the oxidizer gas supply system at the time T9 after a predetermined time, and then the pressure of hydrogen is increased at the time T10 (see FIG. 7 (a)). Thereafter, whether the initiation control is completed is determined at the time T11.

Figure 13:
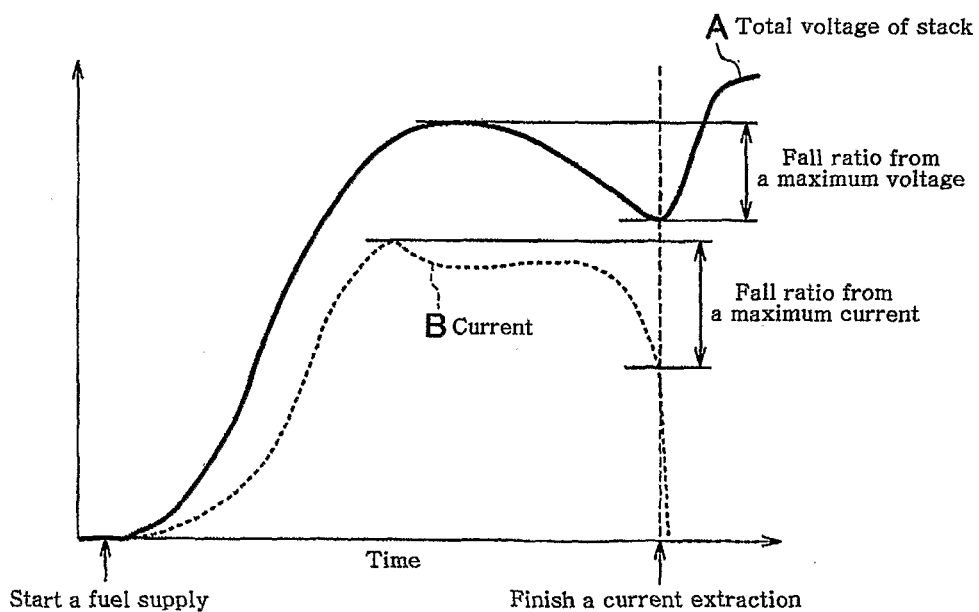
FIG. 13 is a diagram illustrating a process of determining the current extraction termination condition in the current control device and, more specifically, a timing chart illustrating the time trajectory of total voltage of the fuel cell stack and discharge current during a current extraction period.
Figure 14:
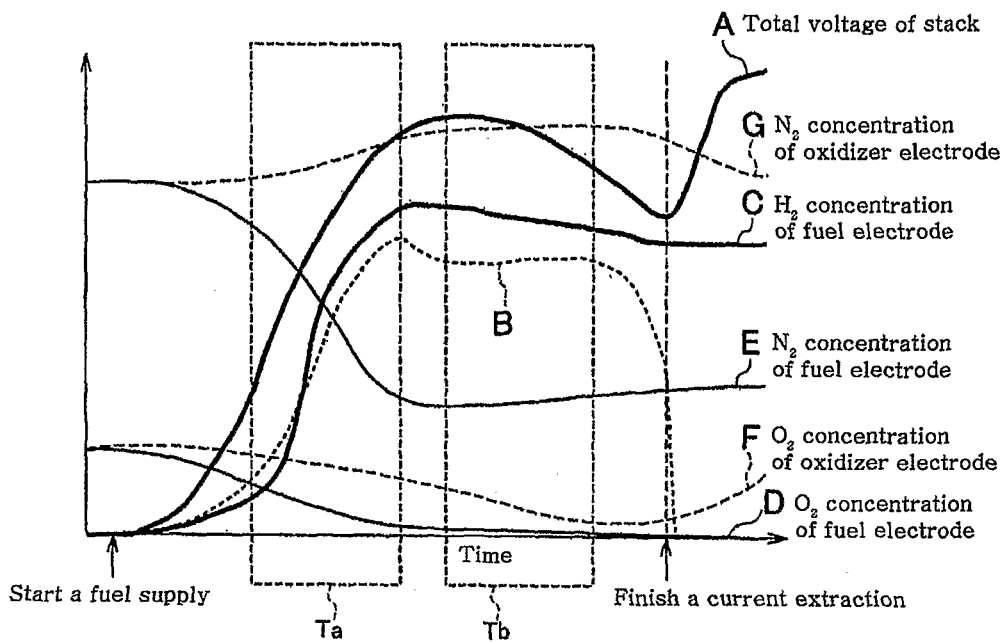
FIG. 14 is a timing chart illustrating the time trajectory of hydrogen concentration, oxygen concentration and nitrogen concentration at the fuel electrode and oxygen concentration and nitrogen concentration at the oxidizer electrode when the discharge current during the current extraction period and the total voltage of the fuel cell stack follow the time trajectories of FIG. 13.
Figure 15:
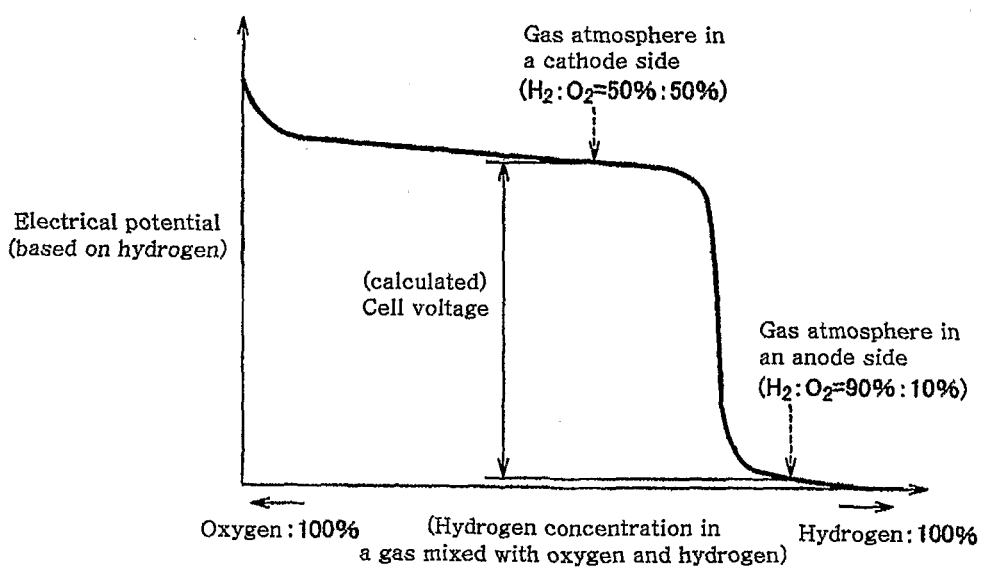
FIG. 15 is a diagram illustrating a mixed electrical potential when hydrogen and oxygen are mixed.

The process of determining whether the current extraction is terminated by the current control device 41 (S108) will be described below in more detail with reference to FIGS. 13 to 15. FIG. 13 illustrates a graph for explaining the process of determining whether the current extraction is terminated by the current control device 41 in accordance with one embodiment of the present invention. More specifically, FIG. 13 shows an exemplary timing chart showing the transition of a total voltage of the fuel cell stack 1 and a current extraction during a current extraction period. FIG. 14 illustrates an exemplary timing chart showing the transition of hydrogen concentration, oxygen concentration and nitrogen concentration at the fuel electrode, as well as the transition of oxygen concentration and nitrogen concentration at the oxidizer electrode when the total voltage of the fuel cell stack 1 and the current extraction during the current extraction period vary, as shown in FIG. 13. FIG. 15 illustrates a graph for explaining a mixed electrical potential measured when hydrogen and oxygen are mixed.

As discussed above, whether the current extraction is terminated by the current control device 41 is determined based on the total voltage of the fuel cell stack 1 measured by the voltage sensor 30. More specifically, as shown in FIG. 13, the current extraction through the current control device 41 is terminated when the voltage (e.g., total voltage) of the fuel cell stack 1 decreases. That is, the maximum value of voltage (e.g., total voltage) of the fuel cell stack 1 is recorded, and the current extraction by the current control device 41 is terminated when the voltage is decreased from the maximum value to a predetermined value or ratio. In FIG. 13, when the total voltage ("A" in FIG. 13) of the fuel cell stack 1 drops by a predetermined value or more (e.g., 30% of the maximum voltage), the current extraction is terminated.

Referring now to FIG. 14, the change in each gas concentration during the current extraction period will be described. In FIG. 14, a first half of the current extraction period is represented as Ta, while the other half is represented as Tb.

During the first half Ta of the current extraction period, oxygen and hydrogen are mixed at the side of the fuel electrode, where the oxygen is consumed and substituted with hydrogen through the current extraction. Next, during the first half Ta of the current extraction period, the oxygen is substituted with hydrogen at the side of the fuel electrode so that the oxygen is almost consumed, while the oxygen at the side of the oxidizer electrode is removed through the current extraction. As such, if the oxygen is sufficiently supplied at the side of the oxidizer electrode, a total voltage A and a current extraction B at the fuel cell stack 1 are decreased.

The above process can be explained using the mixed electrical potential. FIG. 15 shows a graph of a cell voltage measured by the voltage sensor 30, wherein the mix ratio of hydrogen and oxygen and the standard hydrogen electrode are indicated in x and y axes, respectively. FIG. 10 depicts the difference (cell voltage) between potentials at the fuel electrode and the oxidizer electrode when the gas atmosphere at the side of the fuel electrode includes hydrogen and oxygen at a ratio of 90%:10%, while the gas atmosphere at the side of the oxidizer electrode includes hydrogen and oxygen at a ratio of 50%:50%.

When fuel supply commences, since the substitution is performed in the fuel cell stack 1 and the concentration of hydrogen at the side of the fuel electrode is low, the electrical potential at the fuel electrode is substantially equal to that at the oxidizer electrode, and the total voltage of the fuel cell stack 1 is approximated to zero volts. Thereafter, hydrogen concentration at the side of the fuel electrode is increased through supplying fuel, whereas the electrical potential of the fuel electrode decreases, which causes a potential difference between the fuel electrode and the oxidizer electrode. Then, as oxygen at the side of the oxidizer electrode disappears, the electrical potential at the oxidizer electrode becomes close to that at the fuel electrode. Further, since the cell voltage decreases and the total voltage of the fuel cell stack 1 decreases, the amount of current discharged from the fuel cell stack 1 is also simultaneously decreased.

Accordingly, there are at least two characteristics that may serve as conditions for determining whether a current extraction is terminated by the current control device 41, i.e., whether or not the ratio of the fuel gas concentration to the oxidizer gas concentration at the fuel electrode is greater than a predetermined value, and/or at the same time whether the oxidizer gas concentration at the oxidizer electrode begins to decrease. Determining such conditions are performed based on the voltage (e.g., total voltage) of the fuel cell stack 1, which has been described in detail with reference to FIG. 13.

As described above, in the fuel cell system of the present invention, during the initiation stage, the controller 40 begins the current extraction through the current control device 41 after supplying fuel gas to the fuel electrode without supplying oxidizer gas to the oxidizer electrode. It then terminates the current extraction based on the voltage of the fuel cell stack 1 and begins the current generation by supplying the oxidizer gas to the oxidizer electrode.

Therefore, during the initiation stage, the catalyst deterioration due to mixing the fuel gas and oxidizer gas in the fuel electrode can be prevented. Further, by controlling the system based on the state of the fuel cell stack 1, the initiation time and the amount of fuel consumed for initiation can be reduced. As a result, it is possible to obtain a fuel cell system, which has good durability, by preventing deterioration during the initiation stage, while possessing high efficiency by reducing the initiation time.

Further, in the embodiment, the controller 40 determines whether the current extraction is terminated by the current control device 41 based on the total voltage of the fuel cell stack 1 measured by the voltage sensor 30. Thus, by determining the current extraction termination condition based on the total voltage of the fuel cell stack 1, it is possible to easily determine the current extraction termination condition without any additional components customized for that purpose. Further, it is possible to prevent deterioration during the initiation stage without any cost increases. As a result, a fuel cell system with good durability and high efficiency can be obtained by reducing the initiation time.

Moreover, in the embodiment, the voltage sensor 30 is installed in each cell of the fuel cell stack 1. The controller 40 terminates the current extraction through the current control device 41 based on the voltage measured by the voltage sensor 30. Therefore, it is possible to accurately check the state of the fuel cell stack 1 to determine the termination condition, thereby obtaining a fuel cell system with good durability.

Further, in the embodiment, a pair of voltage sensors 30 measures the voltages at the fuel gas supply side and the fuel gas exhaust side of the fuel electrode in one or more cells. Therefore, it is possible to accurately check the substitution of the fuel gas at the fuel electrode of the fuel cell stack 1 so as to determine the termination condition, thereby obtaining a fuel cell system with good durability.

Also, in the embodiment, if the controller 40 determines that the ratio of the fuel gas concentration to the oxidizer gas concentration at the fuel electrode is greater than a predetermined value based on the voltage (e.g., total voltage) of the fuel cell stack 1, then the controller 40 terminates the current extraction through the current control device 41. As such, the catalyst deterioration due to mixing the fuel gas and oxidizer gas in the fuel electrode during the initiation stage can be prevented. Further, by controlling the system based on the state of the fuel cell stack 1, the initiation time and the amount of fuel consumption can be also reduced. As a result, it is possible to obtain a fuel cell system, which has good durability, by preventing deterioration during the initiation stage, while possessing high efficiency by reducing the initiation time.

Additionally, in the embodiment, the controller 40 terminates the current extraction through the current control device 41, if it is determined that the ratio of the fuel gas concentration to the oxidizer gas concentration at the fuel electrode is greater than a predetermined value based on the voltage (e.g., total voltage) of the fuel cell stack 1, while the oxidizer gas concentration of the oxidizer electrode begins to decrease. As such, by determining the catalyst deterioration caused by mixing the fuel gas and oxidizer gas in the fuel electrode during the initiation stage and by checking the decrease in the oxidizer concentration in the oxidizer electrode, deterioration can be inhibited in the initiation stage. Also, it is possible to monitor the progress of deterioration to prevent the deterioration in the initiation stage. As a result, it is possible to accurately determine the termination condition, thereby obtaining a fuel cell system with good durability.

Further, in the embodiment, the controller 40 terminates the current extraction through the current control device 41, if the voltage (e.g., total voltage) of the fuel cell stack 1 decreases. As such, in the initiation stage, by terminating the current extraction through the current control device 41 if the voltage of the fuel cell stack 1 decreases, it can be easily determined if the fuel gas in the fuel electrode is sufficiently abundant with respect to the oxidizer gas, as well as if the oxidizer gas concentration at the oxidizer electrode is low and there is the increased likelihood for deterioration. As a result, it is possible to obtain a fuel cell system that easily determines the current extraction termination condition and has good durability.

In addition, in the embodiment, the controller 40 terminates the current extraction through the current control device 41 if the voltage of the fuel cell stack 1 is decreased by a predetermined value or ratio from a maximum value of the voltage. As such, by determining the current extraction termination condition by the current control device 41 based on the time trajectory of voltage in the initiation stage, it can be easily determined if fuel gas in the fuel electrode is abundant and the oxidizer gas concentration at the oxidizer electrode is considerably low. As a result, it is possible to obtain a fuel cell system, which can more accurately determine the termination condition, and has good durability.

Further, in the embodiment, the fuel system includes the fuel gas circulation system for circulating the fuel gas remaining in the fuel cell stack 1 to the fuel gas supply system. Therefore, the fuel consumption and exhaustion can be lowered and the fuel efficiency is high, thereby resulting in an efficient fuel cell system. Also, in this example, although the fuel circulation pump 7 is used as a means for circulating the fuel gas, an ejector may also be used as the circulating means.

As shown in FIG. 1, the fuel cell stack 1 is typically installed in a case 20 of the fuel cell stack 1 for protection. According to a first modification, when the fuel gas concentration in the case 20 of the fuel cell stack is greater than a predetermined concentration, the controller 40 may forcibly terminate the current extraction through the current control device 41 (e.g., any current extracting means). As such, by forcibly terminating the current extraction through the current control device 41 if the fuel gas concentration in the case 20 of the fuel cell stack is greater than the allowable fuel gas concentration value, the fuel cell stack 1 can be properly activated.

Further, when the fuel gas concentration sensor 34 is installed in the case 20 of the fuel cell stack 1, the fuel gas concentration sensor 34 measures the fuel gas concentration in the case 20 of the fuel cell stack 1. By employing such a configuration, it is possible to accurately detect the fuel gas concentration.

If the fuel gas concentration sensor 34 is not installed in the case 20 of the fuel cell stack, the controller 40 may compute the fuel gas concentration in the case 20 of the fuel cell stack based on the fuel gas pressure at the fuel electrode and the current extraction period by the current control device 41. In one embodiment, the fuel gas concentration may be estimated by referring to a table that maps a fuel gas concentration to the corresponding current extraction period and fuel gas pressure at the fuel electrode, for example, which is prepared based on experimental data. As such, by estimating the fuel gas concentration based on the fuel gas pressure and current extraction period without using the fuel gas concentration sensor 34, it is possible to properly activate the system without increasing any costs.

Further, when the fuel gas concentration sensor 34 is installed at the outlet of the case 20 of the fuel cell stack 1, the controller 40 may supply the case 20 of the fuel cell stack with air when the current control device 41 performs the current extraction during a predetermined period or more. Further, if the measurement value of the fuel gas concentration sensor 34 is a predetermined value or below, then the estimated fuel gas concentration value may be corrected to a lower value. On the other hand, if the measurement value of the fuel gas concentration sensor 34 is greater than a predetermined value, then the estimated fuel gas concentration value may be corrected to a higher value. As such, by changing the estimated value of the fuel gas concentration based on the state of the fuel cell stack 1, the fuel cell system can be properly activated.

According to a second modification, the controller 40 may forcibly terminate the current extraction through the current control device 41 when the fuel gas concentration at the oxidizer electrode is greater than a predetermined value. As such, by forcibly terminating the current extraction through the current control device 41 when the fuel gas concentration at the oxidizer electrode is greater than the allowable fuel gas concentration value, the fuel cell stack 1 can be properly activated.

In addition, when the fuel gas concentration sensor 34 is installed in the oxidizer electrode, the fuel gas concentration sensor 35 measures the fuel gas concentration at the oxidizer electrode. Therefore, it is possible to accurately detect the fuel gas concentration.

If the fuel gas concentration sensor 34 is not installed in the oxidizer electrode, the controller 40 may estimate the fuel gas concentration at the oxidizer electrode based on the fuel gas pressure at the fuel electrode and the current extraction period by the current control device 41 (current extracting means). In one embodiment, the fuel gas concentration may be estimated by referring to a table that maps the fuel gas concentration corresponding to the current extraction period and the fuel gas pressure at the fuel electrode, for example, which is prepared based on experimental data. As such, by estimating the fuel gas concentration based on the fuel gas pressure and current extraction period without using the fuel gas concentration sensor, the system can be properly activated without increasing any costs.

Further, the controller 40 may correct the fuel gas concentration at the oxidizer electrode based on the humidity in an electrolyte membrane. As such, by detecting the humidity in the electrolyte membrane and correcting the fuel concentration at the oxidizer electrode based on the detected humidity, it is possible to precisely estimate the fuel gas concentration.

Moreover, the timer 39 measures the period from the previous stoppage to the initiation of the fuel cell system. In the controller 40, the timer 39 estimates the humidity of the electrolyte membrane based on the measured period. As such, by estimating the humidity of the electrolyte membrane based on the measured period, it is possible to omit a humidity detecting means in the system. Therefore, the fuel cell system can be properly activated without increasing any costs.

Further, when the fuel gas concentration sensor 35 is installed in the oxidizer electrode, the controller 40 may supply the oxidizer electrode with oxidizer gas when the fuel gas pressure at the fuel electrode is a predetermined value and the current control device 41 performs the current extraction during a predetermined period or more. Also, if the measurement value of the fuel gas concentration sensor 35 is a predetermined value or below, then the estimated fuel gas concentration value may be corrected to a lower value. On the other hand, if the measurement value of the fuel gas concentration sensor 35 is greater than a predetermined value, then the estimated fuel gas concentration value may be corrected to a higher value. As such, by changing the estimated value of the fuel gas concentration based on the state of the fuel cell stack 1, the fuel cell system can be properly activated.

As shown in FIG. 1, when there is provided an oxidizer flow detector 31 for detecting the oxidizer gas flow at the oxidizer electrode, the controller 40 may detect an amount of oxidizer supply while performing the current extraction through the current control device 41. According to a third modification, the controller 40 can then terminate the current extraction through the current control device 41 when the oxidizer is not supplied any more. As such, by detecting the amount of oxidizer gas supply at the oxidizer electrode in the initiation stage, it is possible to determine whether the consumption of oxidizer gas at the oxidizer electrode is terminated, thereby more accurately determining the termination of the current extraction.

Fifth Embodiment

A fuel cell system constructed in accordance with a fifth preferred embodiment of the present invention will be described below. The configuration of the fuel cell system of the fifth embodiment is similar to that of the fourth embodiment. Thus, detailed explanations of its components will be omitted herein.

In this embodiment, the controller 40, in the initiation stage, supplies fuel gas to the fuel electrode when the oxidizer gas is not supplied to the oxidizer electrode of the fuel cell stack 1. Then, the controller 40 begins current extraction through the current control device 41 (e.g., any current extracting means). Next, the controller 40 terminates the current extraction based on a current of the fuel cell stack 1. Thereafter, the controller 40 supplies the oxidizer gas to the oxidizer electrode of the fuel cell stack 1 to begin current generation. Thus, whether the current extraction is terminated is determined based on the current of the fuel cell stack 1 in this embodiment, whereas the determination of the current extraction termination condition is performed based on the voltage of the fuel cell stack 1 in the fourth embodiment.

In the fifth embodiment, determining the current extraction termination condition in the current control device 41 is performed by monitoring a target command current, which is provided to the current control device 41, and an actual current value discharged from the fuel cell stack 1 by the current control device 41. Further, it is determined whether the actual current becomes lower than the target command current. If the actual current becomes lower than the target command current, then the current extraction through the current control device 41 is terminated.

Further, the controller 40 terminates the current extraction through the current control device 41 based on the current of the fuel cell stack 1, if it is determined that the ratio of the fuel gas concentration to the oxidizer gas concentration in the fuel electrode is greater than a predetermined value.

In addition, if the controller determines that a ratio of the fuel gas concentration to the oxidizer gas concentration in the fuel electrode is greater than a predetermined value in the fuel electrode based on the current of the fuel cell stack 1, and at the same time, the oxidizer gas concentration at the oxidizer electrode begins to decrease, then the controller terminates the current extraction through the current control device 41.

Also, the controller 40 terminates the current extraction through the current control device 41, if it is determined that the current of the fuel cell stack 1 is decreasing. Particularly, the controller 40 records a maximum value of the current of the fuel cell stack 1 and terminates the current extraction through the current control device 41, if it is determined that the current is decreased by a predetermined value or ratio from the maximum value.

Further, since the operation of the controller 40 during the initiation stage is substantially identical to that of the fourth embodiment (see FIGS. 6 and 7), detailed explanations thereof will be omitted herein.

Determination (Step S108 in FIG. 6) of current extraction termination condition in the current control device 41 in accordance with this embodiment will now be described in detail with reference to FIG. 13.

As described above, the current extraction through the current control device 41 is terminated if it is determined that the current of the fuel cell stack 1 decreases. Also, the maximum value of current of the fuel cell stack 1 is recorded, and the current extraction of the fuel cell stack 1 by the current control device 41 is terminated if it is determined that the current is decreased by a predetermined value of ratio from the maximum value. For example, as shown in FIG. 13, if the current of the fuel cell stack 1 is decreased by a predetermined value (e.g., 20% of the maximum current), then the current extraction is terminated.

As mentioned above, in the fuel cell system of the fifth embodiment, the controller 40 supplies the fuel gas to the fuel electrode when the oxidizer gas is not supplied to the oxidizer electrode, begins the current extraction through the current control device 41, and terminates the current extraction of the fuel cell stack 1. Thereafter, the controller 40 supplies the oxidizer gas to the oxidizer electrode to begin current generation. Therefore, in the initiation stage, catalyst deterioration due to mixing the fuel gas and oxidizer gas in the fuel electrode can be prevented. Further, by different control, depending on the state of the fuel cell stack 1, the initiation time and the amount of fuel consumption can be reduced. As a result, it is possible to obtain a fuel cell system, which has good durability, by preventing deterioration, while possessing high efficiency by reducing the initiation time.

Further, in the fifth embodiment, the controller 40 monitors the target command current provided to the current control device 41 and the actual current discharged from the fuel cell stack 1 through the current control device 41. If it is determined that the actual current is the target command current or below, then the current extraction by the current control device 41 is terminated. As such, by determining the current extraction termination condition based on the current extraction from the current control device 41, the determination of the current extraction termination condition can be performed by only using the current control device 41 without any additional components. As a result, a fuel cell system having high efficiency and good durability can be obtained.

Further, in the embodiment, when the controller 40 determines based on the current of the fuel cell stack 1 that the ratio of the fuel gas concentration to the oxidizer gas concentration in the fuel electrode is greater than a predetermined value, the controller 40 terminates the current extraction through the current control device 41. As such, by detecting the catalyst deterioration caused by mixing the fuel gas and oxidizer gas in the fuel electrode, it is possible to limit the deterioration in the initiation stage. Further, by controlling the system based on the state of the fuel cell stack 1, the initiation time and the amount of fuel consumption can be reduced. As a result, it is possible to obtain a fuel cell system, which has good durability, by preventing deterioration while possessing high efficiency by reducing the initiation time.

Further, in the fifth embodiment, when the controller 40 determines that the ratio of the fuel gas concentration to the oxidizer gas concentration in the fuel electrode is greater than a predetermined value based on the current of the fuel cell stack 1, and at the same time that the oxidizer gas concentration begins to decrease, the controller 40 terminates the current extraction through the current control device 41. As such, it is possible to detect catalyst deterioration caused by mixing the fuel gas and oxidizer gas in the fuel electrode in the initiation stage. Also, it is possible to monitor the progress of deterioration in the initiation stage by checking the reduction of oxidizer concentration in the oxidizer electrode, thereby preventing deterioration in the initiation stage. As a result, it is possible to accurately determine the current extraction termination condition and obtain a fuel cell system with good durability.

Further, in the fifth embodiment, the controller 40 terminates the current extraction through the current control device 41, if it is determined that the current of the fuel cell stack 1 is decreasing. As such, in the initiation stage, by terminating the current extraction through the current control device 41 if it is determined that the current of the fuel cell stack 1 is decreasing, it can be easily determined if the oxidizer gas in the fuel electrode is sufficient and also if the oxidizer gas concentration is low.

Further, in the fifth embodiment, the controller 40 records a maximum value of the current of the fuel cell stack 1 and terminates the current extraction through the current control device 41, if it is determined that the current is decreased by a predetermined value or ratio from the maximum value. As such, by performing the determination of the current extraction terminating condition in the current control device 41 based on the time trajectory of the current in the initiation stage, it can be easily determined that the fuel gas in the fuel electrode is abundant and the oxidizer concentration of the oxidizer electrode is also low. As a result, it is possible to obtain a fuel cell system with high durability.

In addition, it should be noted that the configurations of the first modification (i.e., determining current extraction termination condition based on the fuel gas concentration in the case), the second modification (i.e., determining current extraction termination condition based on the fuel gas concentration at the oxidizer electrode) and the third modification (i.e., determining current extraction termination condition based on the flow of the oxidizer) in the first embodiment are also applicable to the fifth embodiment.

Sixth Embodiment

A fuel cell system constructed in accordance with a sixth preferred embodiment of the invention will be described below. The configuration of the fuel cell system of the sixth embodiment is similar to that of the fourth embodiment. Thus, detailed explanations of its components will be omitted herein.

The controller 40, in the initiation stage, supplies the fuel gas to the fuel electrode when the oxidizer gas is not supplied to the oxidizer electrode of the fuel cell stack 1, and begins a current extraction through the current control device 41. Then, the controller 40 terminates the current extraction based on the voltage (e.g., total voltage) and current of the fuel cell stack 1. Thereafter, the controller 40 begins current generation by supplying the oxidizer gas to the oxidizer electrode of the fuel cell stack 1. According to the result of determining the current extraction termination condition based on both voltage and current, the current extraction through the current control device 41 is terminated.

Thus, the determination of the current extraction termination condition is performed based on the current and voltage of the fuel cell stack 1 in the sixth embodiment, whereas the determination of the current extraction termination condition is performed based on the voltage of the fuel cell stack 1 in the fourth embodiment (thus, a logical multiplication (AND) of the termination conditions of the fourth and fifth embodiments is the termination condition in the sixth embodiment).

Further, the controller 40 terminates the current extraction through the current control device 41 based on the voltage (e.g., total voltage) and current of the fuel cell stack 1, if it is determined that the ratio of the fuel gas concentration to the oxidizer gas concentration in the fuel electrode is greater than a predetermined value.

Also, the controller 40 terminates the current extraction through the current control device if the controller determines that the ratio of the fuel gas concentration to the oxidizer gas concentration at the oxidizer electrode is greater than a predetermined value based on the voltage (e.g., total voltage) and current of the fuel cell stack 1 and at the same time that the oxidizer gas concentration at the oxidizer electrode begins to decrease.

Further, the controller 40 terminates the current extraction through the current control device 41 if it is determined that the voltage and current of the fuel cell stack 1 is decreasing. Particularly, the controller 40 records the maximum values of voltage (e.g., total voltage) and current of the fuel cell stack 1 and terminates the current extraction through the current control device 41, if it is determined that the current and voltage decrease by a predetermined value or ratio from the respective maximum values.

Further, since the operation of the controller 40 in the initiation stage is substantially identical to that of the fourth embodiment (see FIGS. 6 and 7), detailed explanations thereof will be omitted herein.

In the sixth embodiment, the process of determining current extraction termination condition (S108 in FIG. 6) in the current control device 41 will be described in detail with reference to FIG. 13.

As described above, the current extraction through the current control device 41 is terminated if it is determined that the current and voltage (e.g., total voltage) of the fuel cell stack 1 decrease. Further, the controller 40 records the maximum value of voltage (e.g., total voltage) and current of the fuel cell stack 1 and terminates the current extraction through the current control device 41, if it is determined that the current and voltage decrease by a predetermined value or ratio from the respective maximum values. For example, as shown in FIG. 13, if total voltage A and current B of the fuel cell stack 1 are reduced by predetermined values or more (e.g., 30% and 20% of the maximum values, respectively), then the current extraction is terminated.

As mentioned above, in the fuel cell system of the sixth embodiment, according to the result of determining the current extraction termination condition based on the voltage and current, the controller 40 terminates the current extraction through the current control device 41. As such, by determining the current extraction termination condition based on both voltage and current, it is possible to accurately determine the current extraction termination condition compared to determining the current extraction termination condition based on only the voltage or on only the current.

Further, it should be noted that the configurations of the first modification (i.e., determining current extraction termination condition based on the fuel gas concentration in the case), the second modification (i.e., determining current extraction termination condition based on the fuel gas concentration at the oxidizer electrode) and the third modification (i.e., determining current extraction termination condition based on the flow of the oxidizer) in the fourth embodiment are also applicable to the sixth embodiment.

Also, in the fourth to sixth embodiments, if it is determined that the voltage (e.g., total voltage) or current of the fuel cell stack 1 is too low, then the current extraction through the current control device 41 (e.g., any current extracting means) may be terminated, regardless of how much the voltage (e.g., total voltage) and current of the fuel cell stack 1 is decreased from the maximum values.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell system including a fuel cell stack, a fuel gas supplying unit for supplying fuel gas to the fuel cell stack, and an oxidizer gas supplying unit for supplying oxidizer gas to the fuel cell stack, wherein the fuel cell stack includes a plurality of stacked cells each formed by interposing an electrolyte membrane between a fuel electrode supplied with the fuel gas and an oxidizer electrode supplied with the oxidizer gas, the fuel cell system comprising:
   a current control device that extracts a current from the fuel cell stack;
   a voltage sensor that measures voltages from a plurality of different cells of the fuel cell stack; and
   a controller electrically coupled to the fuel gas supplying unit, the oxidizer gas supplying unit, current control device, and the voltage sensor;
   wherein the controller is programmed to cause the fuel gas to be supplied to the fuel electrode without supplying the oxidizer gas to the oxidizer electrode at a time of initiating operation of the fuel cell stack,
   wherein the controller is programmed to extract through the current control device a current sufficient to inhibit deterioration of the electrolyte membrane after a minimum value detected by the voltage sensor becomes zero volts or more,
   wherein the controller is programmed to determine weather to finish the current extraction based on variations of the current amount extracted by the current control device, and
   wherein the controller is programmed to cause the oxidizer gas to be supplied to the oxidizer electrode to start producing electricity in the fuel cell stack once the current extraction has finished.

2. The fuel cell system of claim 1, wherein the controller is programmed to extract through the current control device the current from the fuel cell stack after supplying the fuel gas to the fuel electrode and after the minimum voltage detected by the voltage sensor becomes a predetermined value or more.

3. The fuel cell system of claim 2, wherein the controller is programmed to extract through the current control device the current from the fuel cell stack after the minimum value detected by the voltage sensor becomes 12 millivolts or more per one cell.

4. The fuel cell system of claim 2, wherein the controller through the current control device is programmed to extract sufficient current to maintain a target fuel utilization rate relative to the supplied fuel gas.

5. The fuel cell system of claim 4, wherein the sufficient current extracted from the fuel cell stack by the controller through the current control device corresponds to the target fuel utilization rate or below.

6. The fuel cell system of claim 2, wherein, the controller is programmed to control the current extracted from the fuel cell stack through the current control device so that all voltages detected by the voltage sensor at the time of initiating becomes zero volts or more.

7. The fuel cell system of claim 6, wherein, the controller is programmed to control the current extracted from the fuel cell stack through the current control device so that a maximum current is extracted when all voltages detected by the voltage sensor at the time of initiating becomes zero volts or more.

8. The fuel cell system of claim 7, wherein the current control device is electrically coupled to auxiliary machinery and to a battery that provides an auxiliary power source, and a maximum current extracted from the fuel cell stack through the current control device is determined from a sum of a charging amount of the battery and a consumed power amount of the auxiliary machinery.

9. The fuel cell system of claim 2, wherein the controller is programmed to control the current extracted from the fuel cell stack through the current control device in response to a total voltage of the fuel cell stack based on voltages detected by the voltage sensor.

10. The fuel cell system of claim 9, wherein the current extracted from the fuel cell stack through the current control device increases in response to an increase in the total voltage of the fuel cell stack that is detected by the voltage sensor.

11. The fuel cell system of claim 9, wherein the controller is programmed to control the current extracted from the fuel cell stack through the current control device such that variations of all voltages detected by the voltage sensor become a predetermined value or below.

12. The fuel cell system of claim 2, wherein the current control device is electrically coupled to auxiliary machinery and to a battery that provides an auxiliary power source, and the controller is programmed to output to the current control device a target command current that is a maximum amount or below equal to a sum of a charging amount of the battery and a consumed power amount of the auxiliary machinery.

13. The fuel cell system of claim 12, wherein the current extracted from the fuel cell stack through the current control device is less than the maximum amount or below equal to the sum of the charging amount of the battery and the consumed power amount of the auxiliary machinery.

14. The fuel cell system of claim 1, wherein the voltage sensor comprises a separate voltage sensor disposed in each cell of the plurality of stacked cells in the fuel cell stack.

15. The fuel cell system of claim 1, wherein the voltage sensor comprises a separate voltage sensor disposed in each of a group of cells of the plurality of stacked cells in the fuel cell stack.

16. The fuel cell system of claim 1, wherein the voltage sensor comprises pairs of voltage sensors, and each pair of voltage sensors is disposed in at least one of: each cell of the plurality of stacked cells in the fuel cell stack, and each of a group of cells of the plurality of stacked cells in the fuel cell stack.

17. The fuel cell system of claim 16, wherein each of the pairs of voltage sensors comprise a first voltage sensor measuring voltage at a fuel gas supply side and a second voltage sensor measuring voltage at a fuel gas exhaust side.

18. The fuel cell system of claim 2, wherein the controller is programmed to compare a target command current relative to a real current extracted from the fuel cell stack through the current control device, and the controller is programmed to terminate current extraction through the current control device if the real current is lower than the target command current.

19. The fuel cell system of claim 1, Wherein the controller is programmed to terminate current extraction through the current control device in response to both voltage and current.

20. The fuel cell system of claim 2, wherein the controller is programmed to terminate current extraction through the current control device in response to a ratio of fuel gas concentration to oxidizer gas concentration at the fuel electrode that is greater than a predetermined value that is based on at least one of current and voltage of the fuel cell stack.

21. The fuel cell system of claim 20, wherein the controller is programmed to terminate current extraction through the current control device in response to the ratio of the fuel gas concentration to oxidizer gas concentration at the fuel electrode being greater than a predetermined value based on at least one of the current and the voltage of the fuel cell stack while the oxidizer gas concentration at the oxidizer electrode begins to decrease.

22. The fuel cell system of claim 1, wherein the controller is programmed to terminate current extraction through the current control device in response to a decrease of at least one of current and voltage of the fuel cell stack.

23. The fuel cell system of claim 22, wherein the controller is programmed to record a maximum value of at least one of current and voltage of the fuel cell stack, and the controller is programmed to terminate current extraction through the current control device in response to a decrease in at least one of the current and the voltage by at least one of a predetermined value and a predetermined ratio with respect to the maximum value.

24. The fuel cell system of claim 1, wherein the fuel cell stack comprises a fuel cell stack case protecting the fuel cell stack, and the controller is programmed to terminate current extraction through the current control device in response to a fuel gas concentration in the fuel cell stack case that is greater than a predetermined concentration.

25. The fuel cell system of claim 24, wherein the fuel cell stack comprises a fuel gas concentration sensor disposed in the fuel cell stack case, and the controller is programmed to compare an output of the fuel gas concentration sensor to an estimated fuel gas concentration in the fuel cell stack case, the estimated fuel gas concentration being calculated by the controller based on fuel gas pressure at the fuel electrode and a period of current extraction through the current control device.

26. The fuel cell system of claim 24, wherein an outlet of the fuel cell stack case comprises a fuel gas concentration sensor, and the controller is programmed to supply the oxidizer gas to the fuel cell stack case and the current extraction through the current control device is performed during at least a predetermined period, and wherein the controller is programmed to correct the fuel gas concentration value measured by the fuel gas concentration sensor to a higher value if a value measured by the fuel gas concentration sensor is greater than a predetermined concentration, and wherein the controller is programmed to correct the fuel gas concentration value measured by the fuel gas concentration sensor to a lower value if a value measured by the fuel gas concentration sensor is the predetermined concentration or below.

27. The fuel cell system of claim 1, wherein the controller is programmed to terminate current extraction through the current control device in response to fuel gas concentration at the oxidizer electrode that is greater than a predetermined concentration.

28. The fuel cell system of claim 27, wherein the fuel cell stack comprises a fuel cell stack case protecting the fuel cell stack, and wherein the fuel cell stack comprises a first fuel gas concentration sensor disposed at the oxidizer electrode, and the controller is programmed to compare an output of the fuel gas concentration sensor to an estimated fuel gas concentration in the fuel cell stack case, the estimated fuel gas concentration being calculated by the controller based on fuel gas pressure at the fuel electrode and a period of current extraction through the current control device.

29. The fuel cell system of claim 28, wherein the controller is programmed to correct the fuel gas concentration value measured by the first fuel gas concentration sensor at the oxidizer electrode in response to humidity of the electrolyte membrane.

30. The fuel cell system of claim 29, wherein an idle time measuring unit measures an interval from a previous operation stoppage of the fuel cell stack to an initiation of the fuel cell stack, and the controller is programmed to estimate the humidity of the electrolyte membrane based on the interval measured by the idle time measuring unit.

31. The fuel cell system of claim 28, wherein an outlet of the fuel cell stack case comprises a second fuel gas concentration sensor, and the controller is programmed to supply oxidizer gas to the fuel cell stack case and the current extraction through the current control device is performed during at least a predetermined period, and wherein the controller is programmed to correct the fuel gas concentration value measured by the second fuel gas concentration sensor to a higher value if a value measured by the second fuel gas concentration sensor is greater than a predetermined concentration, and wherein the controller is programmed to correct the fuel gas concentration value measured by the second fuel gas concentration sensor to a lower value if a value measured by the second fuel gas concentration sensor is the predetermined concentration or below.

32. The fuel cell system of claim 1, wherein the an oxidizer flow amount detector outputs to the controller a signal corresponding to an amount of oxidizer gas flowing to the oxidizer electrode, and the controller is programmed to terminate current extraction through the current control device in response to an absence of oxidizer gas flowing to the oxidizer electrode.

33. The fuel cell system of claim 1, wherein a fuel gas circulation system recirculates the fuel gas remaining in the fuel cell stack.

* * * * *